United States Patent
Maiolo et al.

(10) Patent No.: US 11,644,315 B2
(45) Date of Patent: May 9, 2023

(54) SYSTEMS AND METHODS FOR INDOOR WAYFINDING WITHIN A FACILITY

(71) Applicant: MappedIn Inc., Waterloo (CA)

(72) Inventors: Christine Maiolo, Waterloo (CA); Paul Bernhardt, Kitchener (CA); Coraline Sherratt, Waterloo (CA)

(73) Assignee: MAPPEDIN INC., Waterloo (CA)

( * ) Notice: Subject to any disclaimer, the term of this patent is extended or adjusted under 35 U.S.C. 154(b) by 3 days.

(21) Appl. No.: 16/887,810

(22) Filed: May 29, 2020

(65) Prior Publication Data

US 2020/0386553 A1 Dec. 10, 2020

Related U.S. Application Data

(60) Provisional application No. 62/856,957, filed on Jun. 4, 2019.

(51) Int. Cl.
*G01C 21/20* (2006.01)
*G05D 1/00* (2006.01)
*G05D 1/02* (2020.01)

(52) U.S. Cl.
CPC ......... *G01C 21/206* (2013.01); *G05D 1/0016* (2013.01); *G05D 1/0274* (2013.01)

(58) Field of Classification Search
CPC ... G01C 21/206; G05D 1/0016; G05D 1/0274
See application file for complete search history.

(56) References Cited

U.S. PATENT DOCUMENTS

2013/0191246 A1* 7/2013 Calman ............. G06Q 30/0639
705/26.9
2015/0241222 A1* 8/2015 Majumdar ............. G01C 21/00
701/526
2015/0356759 A1* 12/2015 Delling ................. G06T 11/206
345/440
2017/0108339 A1* 4/2017 Silverstein ............ G01S 5/0054
2018/0314991 A1* 11/2018 Grundberg ........... G06Q 10/047
2020/0173789 A1* 6/2020 Kelleher .............. G06Q 10/047
2020/0387948 A1* 12/2020 Kurani ............... G06Q 30/0631

FOREIGN PATENT DOCUMENTS

WO WO-2020012241 A1 * 1/2020 .......... G01C 21/343

OTHER PUBLICATIONS

S. Pradhan, P. R. Krishna, S. S. Rout and K. Jonna, "Wish-List Based Shopping Path Discovery and Profitable Path Recommendations," 2012 Third International Conference on Services in Emerging Markets, 2012, pp. 101-106, doi: 10.1109/ICSEM.2012.21. (Year: 2012).*

* cited by examiner

*Primary Examiner* — Rachid Bendidi
*Assistant Examiner* — Selena M Jin
(74) *Attorney, Agent, or Firm* — Own Innovation; James W. Hinton

(57) ABSTRACT

A wayfinding system, device, and method for providing a route between waypoints within a facility. The method includes generating a navigation graph of traversable areas connecting a set of waypoints; determining a shortest traversable path between each waypoint and every other waypoint based on the navigation graph; setting one or more requirements for plotting a route traversing the set of waypoints; and plotting the route traversing the set of waypoints, wherein the route is plotted according to the one or more requirements.

22 Claims, 19 Drawing Sheets

700

| Shortest distance between waypoints | A | B | C | D | E | F |
|---|---|---|---|---|---|---|
| A |  | 2 | 5 | 5.5 | 7.5 | 7.5 |
| B | 2 |  | 5 | 7.5 | 5.5 | 7.5 |
| C | 5 | 5 |  | 5 | 5 | 7 |
| D | 5.5 | 7.5 | 5 |  | 2 | 5 |
| E | 7.5 | 5.5 | 5 | 2 |  | 5 |
| F | 7.5 | 7.5 | 7 | 5 | 5 |  |

| Shortest path between waypoints | A | B | C | D | E | F |
|---|---|---|---|---|---|---|
| A |  | A-B | A-1-3-C | A-1-3-5-D | A-1-3-5-D-E; A-B-2-4-6-E | A-1-3-5-7-F |
| B | A-B |  | B-2-4-C | B-2-4-6-E-D; B-A-1-3-5D | B-2-4-6-E | B-2-4-6-8-F |
| C | A-1-3-C | B-2-4-C |  | C-3-5-D | C-4-6-E | C-4-6-8-F; C-3-5-7-F |
| D | A-1-3-5-D | B-2-4-6-E-D; B-A-1-3-5D | C-3-5-D |  | D-E | D-5-7-F |
| E | A-1-3-5-D-E; A-B-2-4-6-E | B-2-4-6-E | C-4-6-E | D-E |  | E-6-8-F |
| F | A-1-3-5-7-F | B-2-4-6-8-F | C-4-6-8-F; C-3-5-7-F | D-5-7-F | E-6-8-F |  |

FIG. 7B

SYSTEMS AND METHODS FOR INDOOR WAYFINDING WITHIN A FACILITY

TECHNICAL FIELD

The embodiments disclosed herein relate to indoor wayfinding and in particular to systems and methods for providing a route between a series of waypoints within a facility.

INTRODUCTION

Recent advancements in technology have transformed the ways in which people orient themselves and navigate from place to place, i.e., wayfinding. For instance, technologies such as global positioning system (GPS)-enabled user devices and map applications on mobile devices have made indoor wayfinding more convenient and accurate.

However, fewer advancements have been made in technology relating to wayfinding within a facility, i.e., facility wayfinding. Typically, static physical signs and directories are used for wayfinding within facilities. Such signs and directories are expensive to update and provide limited wayfinding information.

In attempts to improve facility wayfinding, some facilities have developed stand-alone mobile wayfinding applications. However, these mobile wayfinding applications are, generally, facility-specific. Unfortunately, visitors to a facility are often reluctant to install a mobile wayfinding application useful for only that facility on their mobile devices, e.g., mobile phones. Furthermore, these mobile wayfinding applications, generally, rely on signal-based localization of the mobile device for routing. Unfortunately, localization based on signals, e.g., GPS or WiFi signals, may be inaccurate, may require an additional localization system and cannot be relied upon when there is no WiFi or GPS available.

Other facilities have installed stand-alone interactive public display devices, i.e., digital directories. However, these interactive public display devices are fixed at a particular location within the facility. Once visitors leave that location, they must rely on their memory or, in some instances, a printout to recall wayfinding information provided by the interactive public display device. However, printing hardcopy facility maps can be expensive and time-consuming.

Accordingly, there is a need for apparatus, systems and methods for providing a map of a facility that can be customized to show the location of items selected by a user and be updated in real-time to display routes, waypoints, hazards, blocked paths, and other information to aid navigation and reduce travel time within a facility.

SUMMARY

Provided is a wayfinding system for providing a route between waypoints within a facility. The wayfinding system includes a mobile device configured to: store a facility map, a facility directory, facility metadata and item information in a memory of the mobile device; present a user interface on a display of the mobile device; display the facility directory via the user interface, wherein the facility directory lists a plurality of items; receive a user selection of the plurality of items as a set of waypoints via the user interface; generate, by a central processing unit of the mobile device, a navigation graph of the traversable areas connecting the set of waypoints based on the facility metadata; determine, by a graphics processing unit of the mobile device, a shortest traversable path between each waypoint and every other waypoint based on the navigation graph; set, by a central processing unit of the mobile device, one or more requirements for plotting a route traversing the set of waypoints; and plot, by the graphics processing unit, the route traversing the set of waypoints, wherein the route is plotted according to the one or more requirements.

The mobile device may be further configured to display the route traversing the set of waypoints on the facility map.

The mobile device may be further configured to receive one or more updates and adjust the route based on the one or more updates.

The display of the mobile device may be a touch screen display, and wherein the mobile device is configured to receive the user selection by detecting a touch on items listed in the facility directory.

The mobile device may be further configured to display item information for each item listed in the facility directory.

The mobile device may be further configured to determine, by the central processing unit, a time estimate for traversing the route.

The mobile device may be further configured to provide an alert at increments approaching the time estimate.

The wayfinding system may further include a backend system, wirelessly connected to the mobile device, and configured to: store the facility map, the facility directory and the facility metadata in a database; provide the facility map, the facility directory and facility metadata to the mobile device; receive the user selection as the set of waypoints from the mobile device; generate the navigation graph based on the facility metadata; determine, a shortest traversable path between each waypoint and every other waypoint based on the navigation graph; set one or more requirements for plotting the route traversing the set of waypoints; plot the route traversing the set of waypoints according to the one or more requirements; determine the time estimate for traversing the route; and provide the route and the time estimate to the mobile device in near real-time.

The wayfinding system may further include a facility device, connected to the backend system, and configured to edit and provide the facility directory and item information to the backend system in real-time.

The wayfinding system may further include an administrator device, connected the to the backend system, and configured to edit and provide the facility map, the facility directory, the facility metadata and item information to the backend system in real-time.

The wayfinding system may further include a geographical information system (GIS), hosted internally by the backend system or supplied externally to the backend system, configured to store the facility map, the facility directory and facility metadata. The GIS may be further configured to plot the route. The GIS may be further configured to determine a time estimate.

Provided is a non-transitory computer-readable storage medium having stored thereon computer-executable instructions that, when executed by a processor of a mobile device, cause the processor of the mobile device to execute a mobile wayfinding application for integration into a wayfinding system for providing a route between waypoints within a facility. The mobile wayfinding application causes the mobile device to: store a facility map, a facility directory, facility metadata and item information in a memory of the mobile device; present a user interface on a display of the mobile device; display the facility directory via the user interface, wherein the facility directory lists a plurality of items; receive a user selection of the plurality of items as a set of waypoints via the user interface; generate, by a central processing unit of the mobile device, a navigation graph of the traversable areas connecting the set of waypoints based on the facility metadata; determine, by a graphics processing unit of the mobile device, a shortest traversable path between each waypoint and every other waypoint based on the navigation graph; set, by a central processing unit of the mobile device, one or more requirements for plotting a route traversing the set of waypoints; and plot, by the graphics processing unit, the route traversing the set of waypoints, wherein the route is plotted according to the one or more requirements.

Provided is a method for plotting a route between waypoints within a facility. The method includes generating a navigation graph of traversable areas connecting a set of waypoints; determining a shortest traversable path between each waypoint and every other waypoint based on the navigation graph; setting one or more requirements for plotting a route traversing the set of waypoints; and plotting the route traversing the set of waypoints, wherein the route is plotted according to the one or more requirements.

The method may further include displaying the route on a facility map.

The method may further include receiving a user selection of items as the set of waypoints.

The method may further include receiving one or more updates; adjusting the route based on the one or more updates; and displaying the adjusted route on the facility map.

The method may further include determining a time estimate to traverse the plurality of waypoints and adjusting the route to traverse the waypoints within the time estimate.

The navigation graph may be generated concurrent to the determination of the shortest traversable path between each waypoint and every other waypoint.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 7A is a table of the shortest traversable distances between the set of waypoints in the navigation graph shown in FIG. 6A;

FIG. 7B is a table of the shortest traversable paths between the set of waypoints in the navigation graph shown in FIG. 6A;

DETAILED DESCRIPTION

Figure 1A:
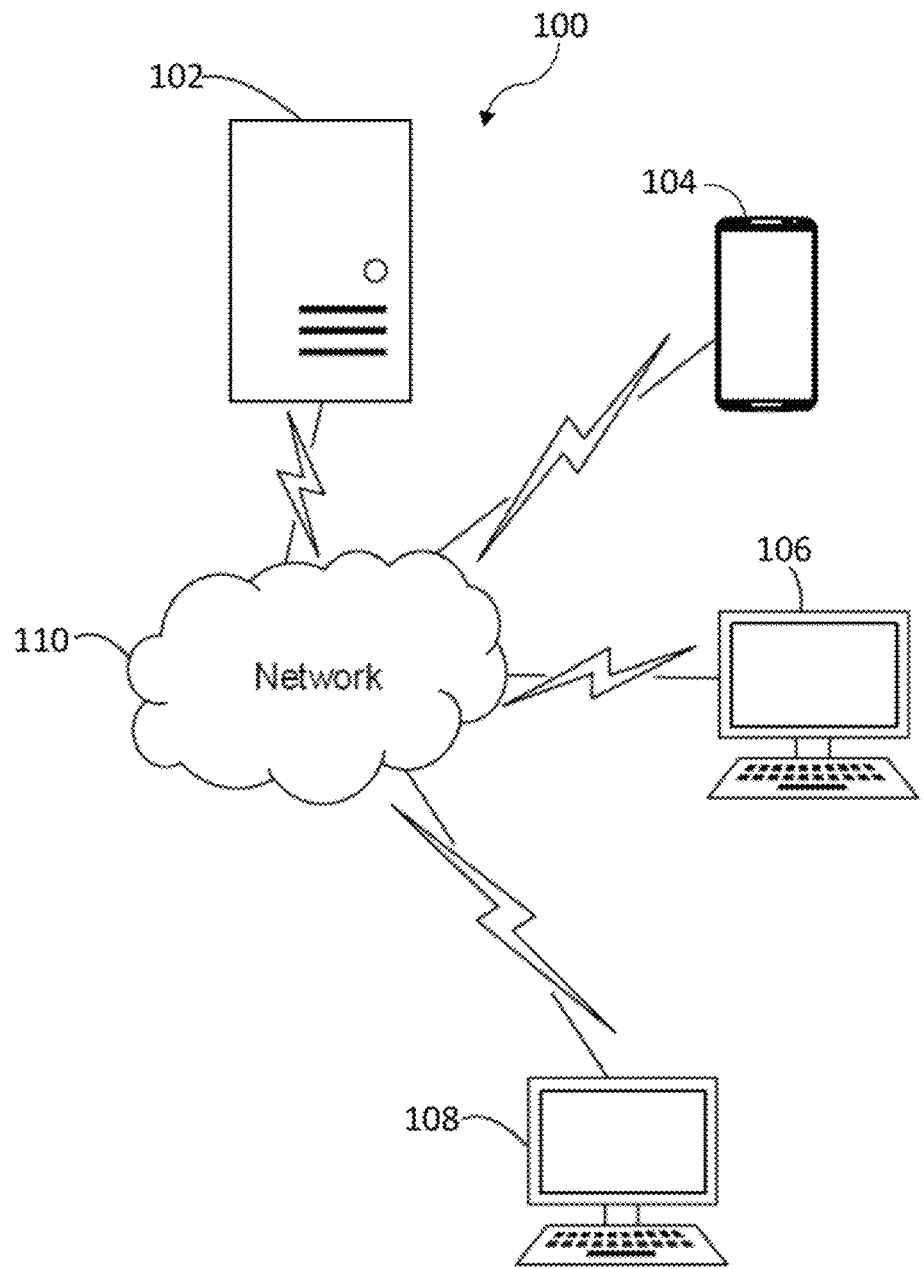
FIG. 1A is a diagram of a facility wayfinding system in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention. Further, the communication between several components may be asynchronous.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

While advancements have been made in technology relating to wayfinding within a facility, i.e., facility wayfinding, many facilities continue to maintain facility maps that can be printed as a hardcopy for physical distribution.

Maintenance of facility maps can involve a coordinated effort by multiple teams within the facility's organization including but not limited to a drafting team, a marketing team, a design team, a print shop and/or a technology team. The drafting team can be responsible for maintaining an accurate drawing of the facility, such as a computer-aided design (CAD) drawing. The marketing team can be responsible for tracking physical changes within the facility. The design team can be responsible for the look and feel of the final map. The print shop can be responsible for printing the map onto a hardcopy paper format. The technology team can be responsible making the map available in electronic form to be accessed on a webpage or on a digital display within a facility.

The process of producing a map typically begins with a CAD drawing of the facility from the drafting team. The marketing team can mark-up on the CAD drawing to indicate changes to the physical facility. Examples of changes to the physical facility include but is not limited to new wings, new partitioning walls, facility unit changes (i.e., incoming facility units, outgoing facility units, and relocation of facility units within the facility). The marketing team can provide the marked-up CAD drawing to the design team.

The design team can take the CAD drawing, makes changes to an existing copy of the printable map, which is typically in Adobe Illustrator®, and applies sections to the map. The design team can add information that may be helpful to a user viewing the printable map. For example, the design team can add store identifiers, amenity icons, and any other appropriate information. The design team can also update the store directory, which includes adding, deleting, or updating store entries, as well as manually matching up what section identifiers to apply to the output. This is typically done in Adobe InDesign®. The design team can generate multiple versions of the printable map by rotating the map into different orientations. For each orientation, map annotations, such as identifiers, icons, etc., may need to be manually adjusted. The design team can send the modified map back to the marketing team for review. This process is reiterated numerous times. Once the printable map is finally generated, it can be sent to the print shop for printing. The map may then also be published in electronic form.

The process of producing a customized map can take months to complete because it can be very manual and thus labor intensive. By the time the process is complete, and a customized map is produced, it can be out of date already and the process is restarted again.

A system and method that can readily generate a customizable map can be advantageous. In particular, reducing the amount of manual work and the back and forth review process can be desirable. Further, a customizable map that can display routes to lessen the time taken to travel within a facility is desirable for patrons and customers.

Referring to FIG. 1A, illustrated therein is a diagram showing one exemplary embodiment of a wayfinding system 100 for providing a route between waypoints within a facility. The facility may be any type of facility and may include a single building or two or more separate buildings, each of which may include any suitable facility units and other objects. Typically, the facility is a commercial retail facility or warehouse. For example, the facility may be a grocery store, department store, warehouse, and the like, which include a variety of items. The facility may be an indoor facility, an outdoor facility and/or may include a combination of indoor and outdoor portions. The wayfinding systems described herein may be particularly useful for indoor facilities and/or facilities with at least some indoor portions.

The wayfinding system 100 is for a facility including multiple objects (i.e., a facility wayfinding system). The wayfinding system 100 is not restricted to a single facility but may be extended to multiple facilities of the same type and/or different types, each including multiple objects.

The objects in a given facility may be any type of suitable object for that facility. Examples of objects that may be included in a given facility can include shelves, counters, bins, racks, refrigerators, freezers, benches, tables, aisles, amenities, obstructions, connections, sections and the like, positioned at locations or areas within the facility. A given facility may include only a single type of objects, or alternatively a facility may include a mixture of different types of objects.

Obstructions may be objects that are generally not traversable by end users of the wayfinding system 100 and that may impede navigation throughout the facility. Examples of obstructions can include area(s) temporarily closed for maintenance and/or sanitation. Obstructions may also be furniture, fountains, sculptures and other objects that are placed within a facility or but typically do not form part of the structure of the facility.

Connections may be portions of a facility that extend between, and connect, two or more traversable areas within the facility. Examples of connections may include hallways, walkways, staircases, elevators, escalators, ramps, moving walkways and the like.

Sections may be portions of the facility where items of the same type/class are kept together. For example, sections in a grocery store may include produce, meat, refrigerator and dairy.

The wayfinding system 100 allows users, (e.g., patrons/customers of the facility), to orient themselves and to navigate from place to place within the facility, enabling them to find the items they are looking for and to discover things around them. For example, a shopper at a department store can use the wayfinding system 100 to search for a particular section or a particular item or class of items (e.g., shoes), navigate to the relevant location, and/or look at the current promotions.

The wayfinding system 100 may include a facility wayfinding system, such as those described in United States Patent Application Publication Number 2014/0156186, application Ser. No. 13/852,304, which is hereby incorporated by reference in its entirety.

Still referring to FIG. 1A, the wayfinding system 100 includes a plurality of mobile devices 104, a plurality of facility devices 106, and a plurality of administrator devices 108. The mobile devices 104, facility devices 106, administrator devices 108, and are herein collectively referred to as "user devices". The user devices 104, 106, 108 are all supported by a backend system 102 which is operatively connected to the user devices 104, 106, 108 via a communication network 110. The individual connections may be wired or wireless connections.

The facility devices 106 and administrator devices 108 may be a computer tablet, smartphone, or another suitable device. The mobile devices 104 are preferably portable electronic devices, for example, a smartphone or tablet. The backend system 102 and user devices 104, 106, 108 may include a connection with the communication network 110 such as a wired or wireless connection to the Internet. In some cases, the communication network 110 may include other types of computer or telecommunication networks.

The backend system 102 may be a purpose-built machine designed specifically for implementing a system and method for facility wayfinding. The backend system may be a server platform. The backend system 102 may include multiple servers. The backend system 102 may be in a remote location from the user devices 104, 106, 108.

The backend system 102 and user devices 104, 106, 108, may include one or more of a memory, a secondary storage device, a storage unit, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor of each of the backend system 102 and user devices 104, 106, 108 may execute applications, computer readable instructions or programs. The applications, computer readable instructions or programs may be stored in memory or in secondary storage, or may be received from the Internet or other communication network 110. Input device may include any device for entering information into backend system 102 and user devices 104, 106, 108. For example, input device may be a keyboard, keypad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, backend system 102 and user devices 104, 106, 108 may include multiple of any one or more of processors, applications, software modules, second storage devices, network connections, input devices, output devices, and display devices.

Although backend system 102 and user devices 104, 106, 108 are described with various components, one skilled in the art will appreciate that the backend system 102 and user devices 104, 106, 108 may in some cases contain fewer, additional or different components. In addition, although aspects of an implementation of the backend system 102 and user devices 104, 106, 108 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other communication network; or other forms of RAM or ROM. The computer-readable media may include instructions for controlling the backend system 102 and user devices 104, 106, 108 and/or processor to perform a particular method.

In the description that follows, the backend system 102, and user devices 104, 106, 108 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the user devices 104, 106, 108 may send information to and receive information from the backend system 102. For example, a facility user using the facility device 104 may manipulate one or more input devices (e.g. a mouse and a keyboard) to interact with a user interface displayed on a display of the facility device 104 to respond to questions. Generally, the device may receive a user interface from the communication network 110 (e.g. in the form of a webpage). Alternatively or in addition, a user interface may be stored locally at a device (e.g. a cache of a webpage or a mobile application).

The backend system 102 may be configured to receive a plurality of information, from each of the plurality of mobile devices 104, facility devices 106, and administrator devices 108. Generally, the information may comprise at least an identifier identifying the user who may be a patron/customer associated with a mobile device, an employee associated with a facility, or an administrator of the system. For example, the information may comprise one or more of a username, e-mail address, password, or social media handle.

In response to receiving information, the backend system 102 may store the information in a storage database. The storage database may correspond with secondary storage of the backend system 102 or the user device 104, 106, 108. Generally, the storage database may be any suitable storage device such as a hard disk drive, a solid-state drive, a memory card, or a disk (e.g. CD, DVD, or Blu-ray etc.). Also, the storage database may be locally connected with the backend system 102. In some cases, storage database may be located remotely from the backend system 102 and accessible to backend system 102 across a communication network 110 for example. In some cases, the storage database may comprise one or more storage devices located at a networked cloud storage provider.

The mobile device 104 may be associated with a customer account. Similarly, the facility device 106 may be associated with a facility account and the administrator device 108 may be associated with an administrator account. Any suitable mechanism for associating a device with an account is expressly contemplated. In some cases, a device may be associated with an account by sending credentials (e.g. a cookie, login, or password etc.) to the backend system 102. The backend system 102 may verify the credentials (e.g. determine that the received password matches a password associated with the account). If a device is associated with an account, the backend system 102 may consider further acts by that device to be associated with that account.

The user devices 104, 106, 108 and the backend system 102 may communicate asynchronously, for example, by using an implementation of the WebSocket protocol, such as Socket.IO. Updates may be sent from the backend system 102 to each of the user devices 104, 106, 108 in real time as interrupts, i.e., without polling. Likewise, user interaction data may be sent from each of the user devices 104, 106, 108 to the backend system 102 in real time as interrupts, i.e., without polling.

Figure 1B:
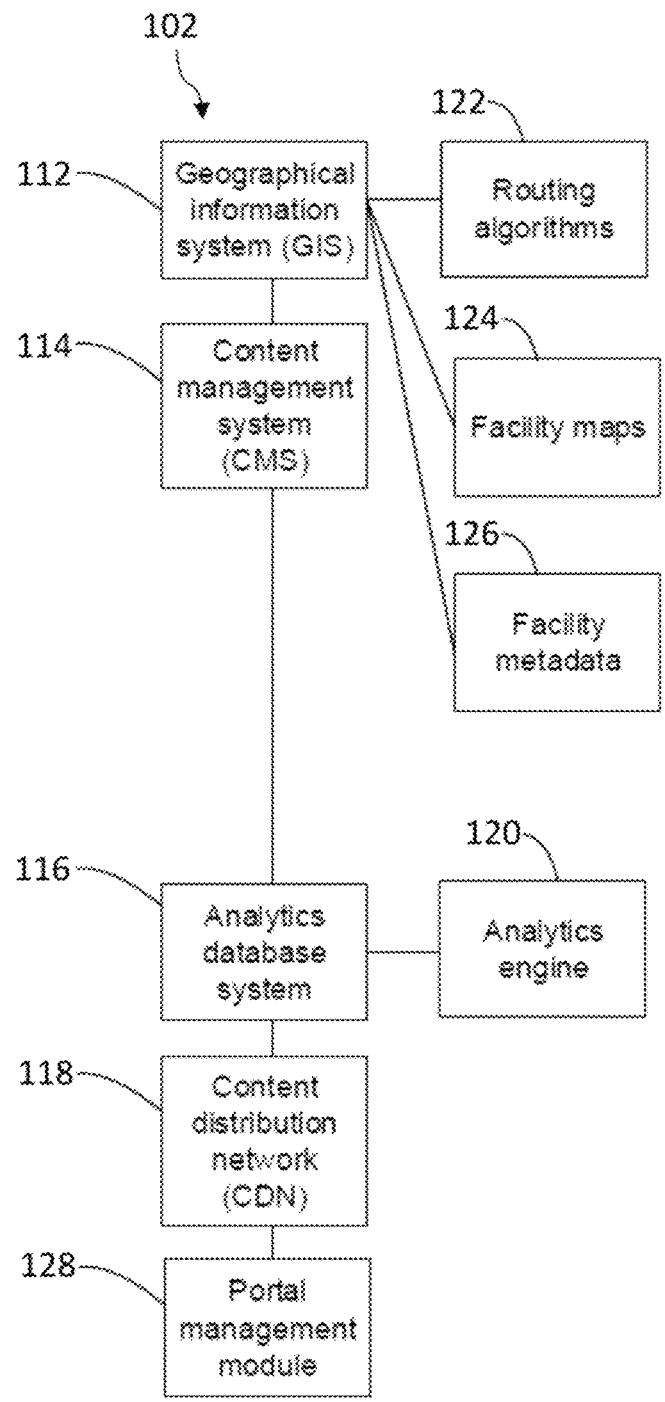
FIG. 1B is a diagram of a backend system for integration into a facility wayfinding system, in accordance with an embodiment.

Referring to FIG. 1B, illustrated therein is the backend system 102, in accordance with an embodiment. The components of the backend system 102 may be hosted on a single server or multiple servers. The backend system 102 may include at least one database server (not shown). The backend system 102 includes a geographical information system (GIS) 112, a content management system (CMS) 114, an analytics database system 116, and a portal management module 128. In some instances, the backend system 102 also includes a content distribution network (CDN) 118.

The GIS 112 may be hosted internally by the backend system 102 or supplied externally. The GIS 112 is, typically, a representational state transfer (REST)-ful application programming interface (API). The GIS 112 includes routing algorithms 122, electronic facility maps 124, and associated facility metadata 126. The GIS 112 may store the electronic facility maps 124 and the facility metadata 126, handle updates to the electronic facility maps 124 and the facility metadata 126, and provide the electronic facility maps 124 and the facility metadata 126 to the user devices 104, 106, 108.

Typically, the GIS 112 provides the electronic facility maps 124, e.g., as PNG files, and the facility metadata 126, e.g., as JSON/XML files, over a communications network (i.e. network 110 in FIG. 1A). The facility metadata 126 is customizable for the type of facility, and may include digital representations of the layout of the facility and objects and items within the facility. For example, facility metadata may include polygons encapsulating objects (i.e. shelves, racks, tables, etc.), item identifiers (a barcode, shelf code, etc.), section identifiers for grouping items into categories, nodes corresponding to locations (i.e. waypoints, aisles, turns, intersections, etc.) within a facility, and qualitative metadata, such as item information which describes the items. Optionally, information about the objects utilized for a given system (i.e. all of the objects that are used to define a given facility, etc.) can be stored in the server platform in an object library (not shown) that can be a separate module in the backend system 102, or may be incorporated within the electronic facility maps 124, facility metadata 126 or any other suitable location.

The GIS 112 also uses the routing algorithms 122 to calculate routes and provides the routes to the user devices 104, 106, 108. Typically, the routing calculations output a JSON/XML list of node or polygon identifiers representing a complete path, which the user devices 104, 106, 108 will interpret and display. The output may also include other facility metadata 126, such as total estimated travel time based on the route and real-time updates and alerts, as described herein.

In some embodiments, the CMS 114 may be a frontend interface application, typically, implemented as a web service. CMS 114 may communicate with GIS 112, which then modifies the database server. In this case, GIS 112 may be an Application Program Interface (API) which manipulates the database server.

In some embodiments, CMS 114 stores content, including information relating to the facility and the objects within the facility, handles updates to the content received from the user devices 104, 106, 108 and provides content to the user devices 104, 106, 108. For example, the CMS 114 may be a no structured query language (NoSQL) database application. The content stored in the CMS 114 is customizable for the type of facility. Typically, the item information stored for each object includes, for example, a profile, a link to a webpage and/or link to a social media page, a photograph, directory information, e.g., sale/promotional information, e.g., an advertisement and/or a marketing message, and/or a promotional item, e.g., a digital coupon. Often, the information relating to the facility and the objects may be tied to a related entry in the facility metadata 126 stored in the GIS 112. This may allow larger, less frequently accessed files to be stored in the CMS 114, rather than the GIS 112.

In some embodiments, the analytics database system 116 includes or is operatively connected to an analytics engine 120. The analytics database system 116 may be a database application, typically implemented as a web service. The analytics database system 116 stores all user interactions, e.g., user selections or "hits", searches, dates, types of user device 104, 106, 108 and/or movement patterns represented as heat maps, in real time, and generates analytics relating to the user interactions. Advantageously, because user interactions are recorded for several different user devices 104, 106, 108, a relatively large sample size is obtained. The large sample size may allow analytics engine 120 to plot heat maps that are useful for users and to provide suggestions to improve user experience.

The mobile devices 104 may be efficiently managed and run both online and offline. The mobile devices 104 may create a simple navigation tool that engages visitors as they seek out more information about the facility. Each interface may be carefully designed with a focus on the user experience. Designs can be adapted to each facility's brand and specific needs, providing a unique interface with no disruption to the user experience. The mobile devices 104 may be configured to provide a smooth, intelligent personal indoor mapping experience. Users can access directions and facility information from anywhere in the facility. Alternatively or additionally, visitors can plan routes prior to arriving and download the relevant facility map, facility directory and item information for later use at the facility.

The backend system 102 may include a portal management module 128 to access the backend system 102 for managing the wayfinding system (i.e. wayfinding system 100 in FIG. 1A). A facility device and an administrator device (i.e. facility device 106 and administrator device 108 in FIG. 1A) may communicate with the portal management module 128 to create and modify facility related data.

With the portal management module 128, all building data may optionally be generated or modified using one tool via, for example, a web browser. The portal management module 128 may include collaborative tools with secure user accounts and permissions. In some embodiments, each user may be assigned a role with appropriate security credentials, such as an administrator (using administrator device 108), a facility manager (using facility device 106), and a client (using mobile device 104). The administrator device 108 may have higher security clearance in terms of accessing and updating data, and modifying settings. The facility device 106 may be configured to change facility directories and item information, logos and so on, but may not have permission to alter facility maps, etc. The mobile device 104 can modify or alter data relating to the store account that it is associated with. Additional rules may be enforced if desired. For example, users of mobile devices may not access and/or change certain data pertaining to a facility directory, and so on.

For example, a facility manager may log into portal 128 make edits to an electronic facility map 124 and save the electronic facility map 124 at different stages. The unfinished electronic facility map 124 may be saved in draft mode, where the facility editor may not have permission to publish the updated map until approved by administrator or facility owner from the administrator device 108 or the facility device 106, and the wayfinding system 100 may be configured to track approvals.

In some embodiments, the wayfinding system 100 may be created, edited and maintained substantially completed by one or more trained system administrators. In such examples, the system administrator may create the electronic facility maps 124 (including the objects within a given facility) and the facility metadata 126. A system administrator can be trained to create the electronic facility maps 124, objects and other types of system data in an organized manner and/or in accordance with a set of prescribed practices to help ensure that the resulting data is consistent, is compatible with existing data, and in particular is valuable such that it can be used for mapping and wayfinding functions. This may help ensure that the system data is accurate and valuable, but may be somewhat cumbersome when the wayfinding system 100 is in use. For example, a trained system administrator may not be readily available each time the electronic facility maps 124 or metadata 126 require updating.

Alternatively, a user, such as the owner and/or operator of a given facility that is represented in the wayfinding system 100, may wish to have a certain degree of autonomy and the ability to create, edit and maintain the electronic facility maps 124 and facility metadata 126 without requiring the input, and potentially cost, of a system administrator.

Figure 2:
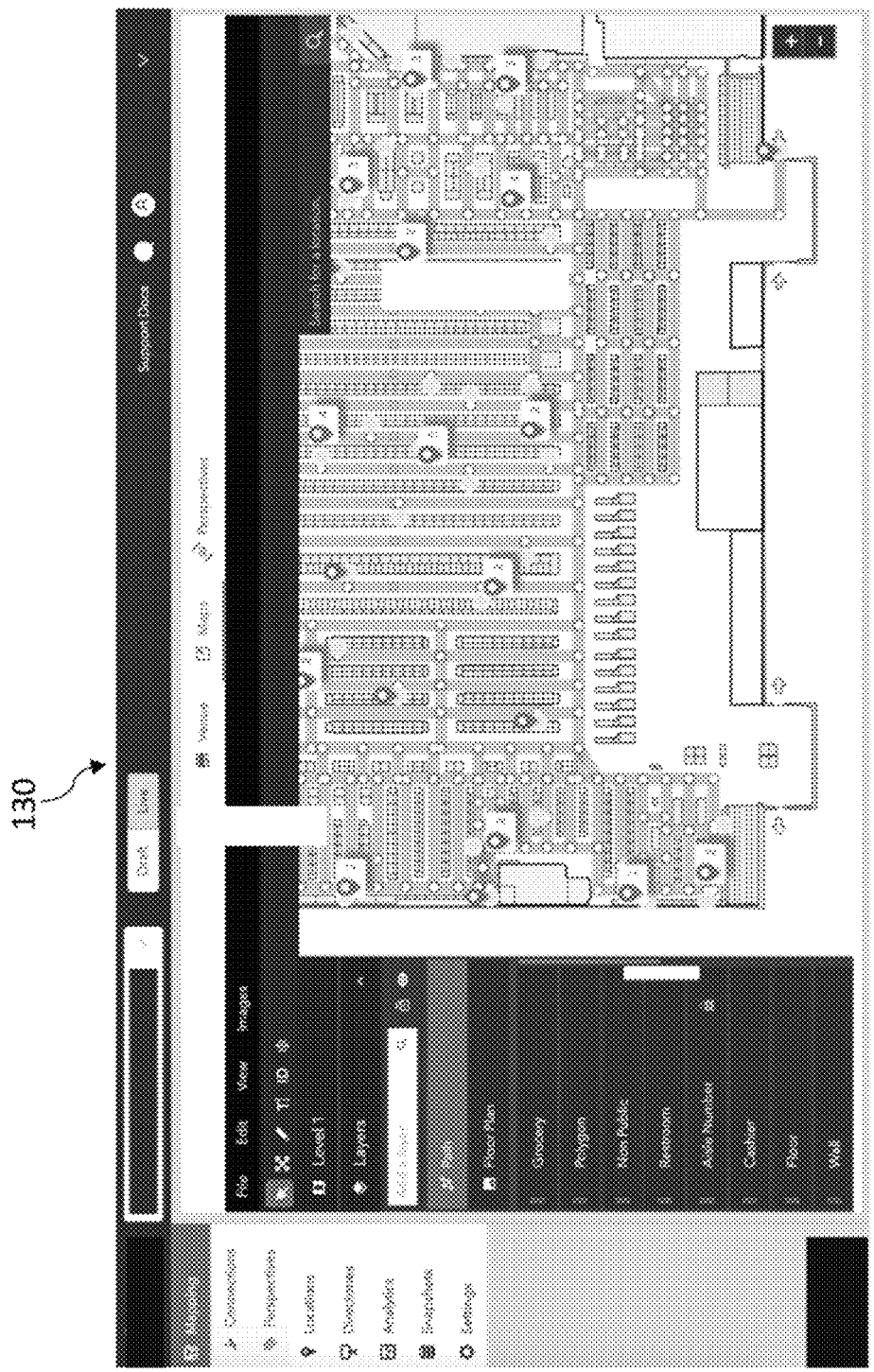
FIG. 2 is an exemplary screenshot of a map editing tool, in accordance with an embodiment.

Optionally, to help enable system users to create, edit and maintain the electronic facility maps 124 and facility metadata 126 in a useful and correct manner, the wayfinding system 100 may provide one or more map editing tools or frameworks. The map editing tools may be part of the wayfinding system 100, and may be accessed, for example, via the portal management module 128 or in any other suitable way. For example, if not part of the portal management module 128 the wayfinding system 100, and/or the backend system 102 may include a separate map editing module. Referring to FIG. 2, illustrated therein is an exemplary screenshot of a map editing tool 130. The map editing tool 130 may preferably be configured to help a system user, with little to no design and/or programming experience, to create, edit, and maintain data, such as the electronic facility maps 124, facility metadata 126, facility units, obstructions, connections, regions and the like, that can be used in the operation of the wayfinding system 100. The map editing tool 130 may have any suitable configuration that can help guide and/or assist system users in creating their desired data in a useful manner, while still being relatively easy to use and allowing a system user a relatively high degree of autonomy and design freedom with respect to the electronic facility maps 124 and facility metadata 126 (as well as any other applicable portions of the wayfinding system 100 and backend system 102, such as the routing algorithms 122, etc.).

The map editing tool 130 can also be configured to cause the wayfinding system 100 to generate a map from the electronic wayfinding data, such as the electronic facility maps 124 and facility metadata 126 including facility units, obstructions, connections, regions, and the like. That is, the wayfinding system 100 can retrieve the electronic wayfinding data and generate facility map files using this data.

Figure 3:
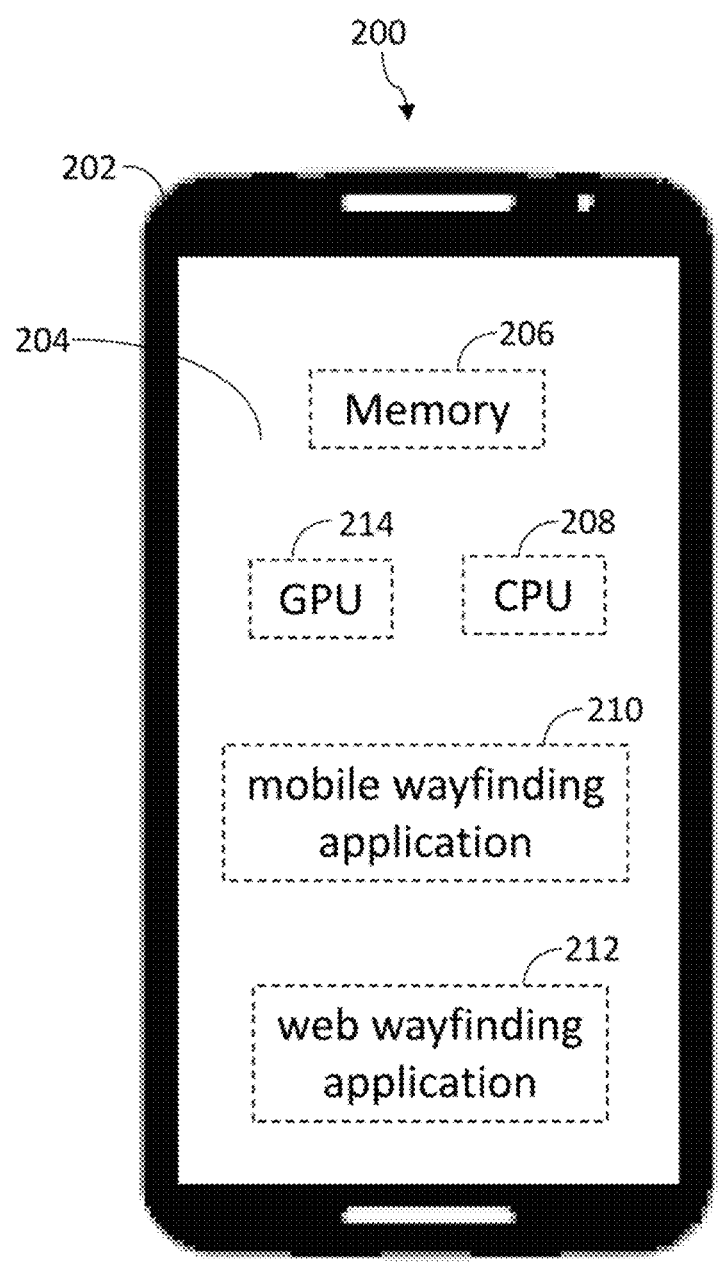
FIG. 3 is a diagram of a mobile device for running a mobile wayfinding application for integration into a wayfinding system.

Referring to FIG. 3, illustrated therein is a mobile device 200 for running a mobile wayfinding application for integration into a wayfinding system, in accordance with an embodiment. The mobile device 200 may be mobile device 104 in FIG. 1. The mobile device is a smartphone. The mobile device 200 includes a housing 202 and a user interface 204 supported by the housing 202. The user interface 204 is a touch-screen display. The mobile device 200 further includes a memory 206, a central processor (CPU) 208 and a graphics processor (GPU) 214 within the housing 202.

The mobile device 200 may include a mobile wayfinding application 210. The mobile wayfinding application 210 is, typically, a native application stored in the memory 206 of the mobile device 200 and running in the operating system of the mobile device 200. In general, different versions of the mobile wayfinding application 210 are written for different mobile platforms, in the appropriate languages, using the appropriate software development kits (SDKs) and frameworks. The mobile wayfinding application 210 may communicate with a backend system (i.e. backend system 102 in FIGS. 1 and 2) over a communications network. Whilst connected to the backend system, the mobile wayfinding application 210 may download facility maps, and facility metadata which are stored in the memory 206 of the mobile device 200. The mobile wayfinding application 210 may also operate in an offline manner when the mobile device 200 is not connected to a communications network.

The mobile wayfinding application 210 includes computer-executable instructions that, when executed by the CPU 208, causes the mobile device 200 to display information relating to the facility (i.e. a facility map, facility directory or item information), including wayfinding information (i.e. a route), via the user interface 204, and receives user input via the mobile user interface 204 as will be described in detail below. The representation of the information relating to the facility and wayfinding information in the user interface 204 is optimized for personal viewing by a single user on a small-screen display. For example, a facility directory, item information and a facility map showing a route may be displayed on different screens of the user interface 204. Typically, the initial screen of the mobile user interface 204 shows a list of multiple facilities for which facility information and wayfinding is available.

The mobile device 200 may include a web wayfinding application 212. The web wayfinding application 212 runs in a web browser on the mobile device 200. The web wayfinding application 212 is hosted by a backend system (i.e. backend system 102 in FIGS. 1 and 2). The web wayfinding application 212 requires the mobile device 200 to be connected to the backend system over a communications network. The web wayfinding application 212 is generally similar to the mobile wayfinding application 210, and may be used in lieu of the mobile wayfinding application 210 if the user does not wish to install the mobile wayfinding application 210 on the mobile device 200.

Figure 4:
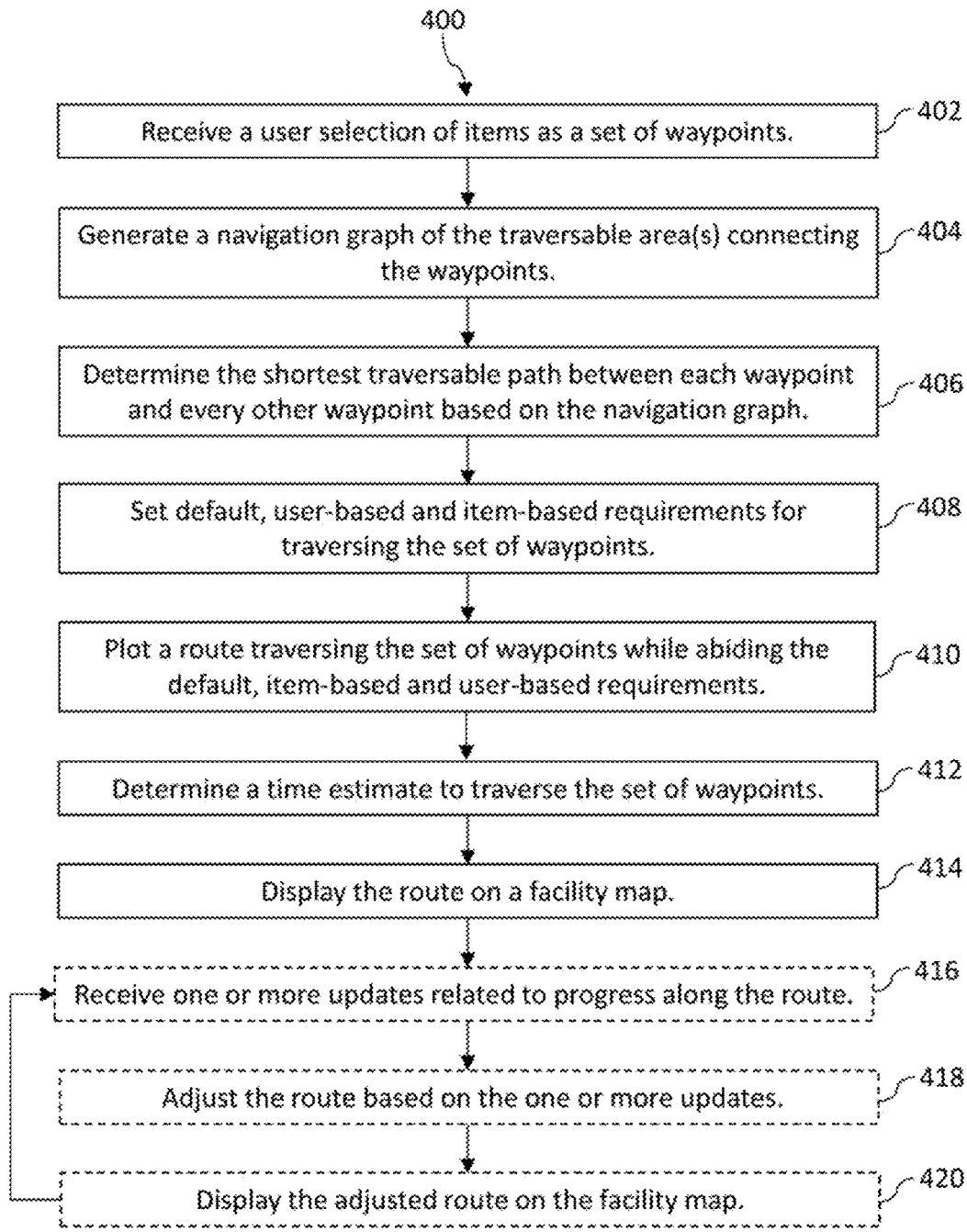
FIG. 4 is a flow chart of a method for plotting and displaying a route between a set of waypoints within a facility, in accordance with an embodiment.

Referring to FIG. 4, illustrated therein is a flowchart of a method 400 for plotting and displaying a route between a set of waypoints within a facility, in accordance with an embodiment. The method 400 may be performed by a backend system (i.e. backend system 102 in FIGS. 1 and 2) or by a mobile device (i.e. mobile device 200 in FIG. 3) running a mobile wayfinding application. The method 400 may be implemented, for example: by a shopper, to reduce the time to locate and pick up items in a store; or by facility staff for reducing stocking time and inventory management in a facility.

The route traversing the waypoints is plotted according to certain requirements, which may be default requirements stipulated for all routes, item-based requirements based on the nature of the item located at a waypoint, or user-based requirements as selected by a user. For example, a default requirement is that all waypoints are visited only once along the route (i.e. waypoints are not passed more than once). Another default requirement may be that the final waypoint on the route is the cashier/checkout. A user-based requirement may be the selection of a start location and/or end location. An item-based requirement may be larger items along the route are picked up before smaller items for easier arrangement of the items in a shopping cart. Another item-based requirement may be frozen or refrigerated items are picked up closer to the end of the route to reduce thawing. Yet another item-based requirement may be frozen items must be picked up within a time estimate to prevent thawing.

Thus, plotting the route traversing the waypoints based on the default and/or user-selected and/or item-based requirements can be a computationally intensive process that places significant stresses on the mobile device's components and battery. An advantage of the present wayfinding system is to reduce the time and energy requirement in plotting the route, the method 400 delegates certain computational tasks to the GPU and other tasks to the CPU of the mobile device. By doing so, the route may be plotted in iterations, with the GPU and CPU sharing tasks to speed up the overall process.

At 402, a user selection of items is received as a set of waypoints. Each waypoint corresponds to an item selected by a user from a facility directory. Each waypoint is further associated to an object node in the facility metadata. According to an embodiment, the set of waypoints may be received by a database in a backend system (i.e. backend system 102 in FIGS. 1 and 2). According to other embodiments, the set of waypoints is received by a memory in a mobile device running a mobile wayfinding application (i.e. mobile device 200 of FIG. 3).

Figure 5A:
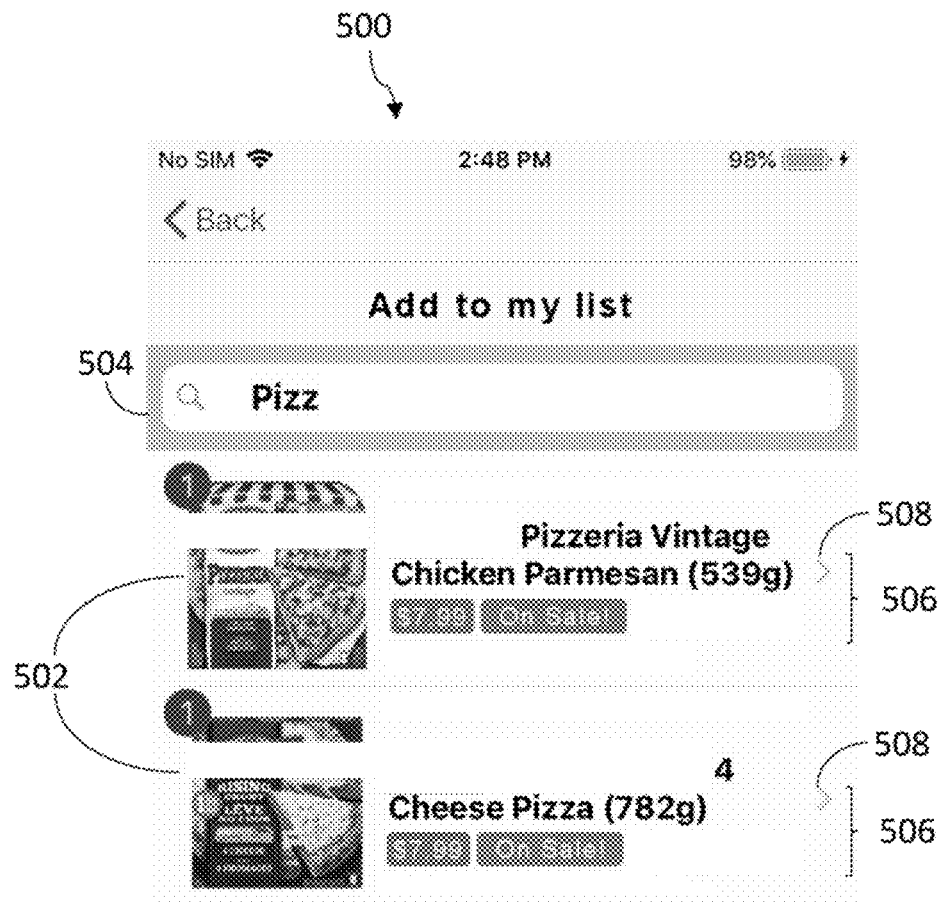
FIG. 5A is an exemplary screenshot of a facility directory displayed on a screen of a mobile device, in accordance with an embodiment.

Now referring to FIG. 5A, illustrated therein is an exemplary screenshot of a facility directory 500 displayed on a touchscreen of a mobile device. The facility directory 500 lists the items 502 within the facility. The items 502 may be represented by an item name and/or image. The items 502 may be grouped into categories. For example, if the facility is a grocery store, the facility directory 500 may list food items 502 grouped into categories such as produce, dairy, meat, etc. The facility directory 500, may be searched by entering an item name in a search field 504. The facility directory 500 may be scrolled by, for example, a single-finger gesture via the touchscreen. A user may select an item 502 listed in the facility directory 500 by a touch command via the touchscreen, to add the item 502 to a shopping list.

The facility directory 500 includes item information associated to that item 502. As explained above, item information is included in the facility metadata 126 stored by the GIS 112 of the backend system 102 of FIG. 1B. Item information may include a variety of information related to the item, not limited to, the brand/manufacturer, creation date, expiry date, inventory level, location of the item within the facility (i.e. aisle, shelf, etc.), size/weight, price and promotional information. An item information summary 506 is provided for each item 502. Other item information may be viewed by a touch command on an arrow 508 beside each item 502.

Each item 502 in the facility directory 500 is further associated to other facility metadata including a unique item identifier (e.g. a barcode, a shelf-code, a string of alphanumeric characters, and the like) that is used by the facility for identification of the item and for checking inventory levels. Each item 502 in the facility directory 500 is further associated to at least one location (referred to herein as a "waypoint") within the facility where that item 502 is located. Each waypoint corresponds to one object node in the facility metadata. If the same item 502 is located at more than one waypoint within a facility (i.e. the same item is found at multiple locations within the facility), then the item 502 may be associated to multiple nodes. Thus, each item 502 (and item identifier) corresponds to at least one waypoint and at least one node in the facility metadata.

Figure 5B:
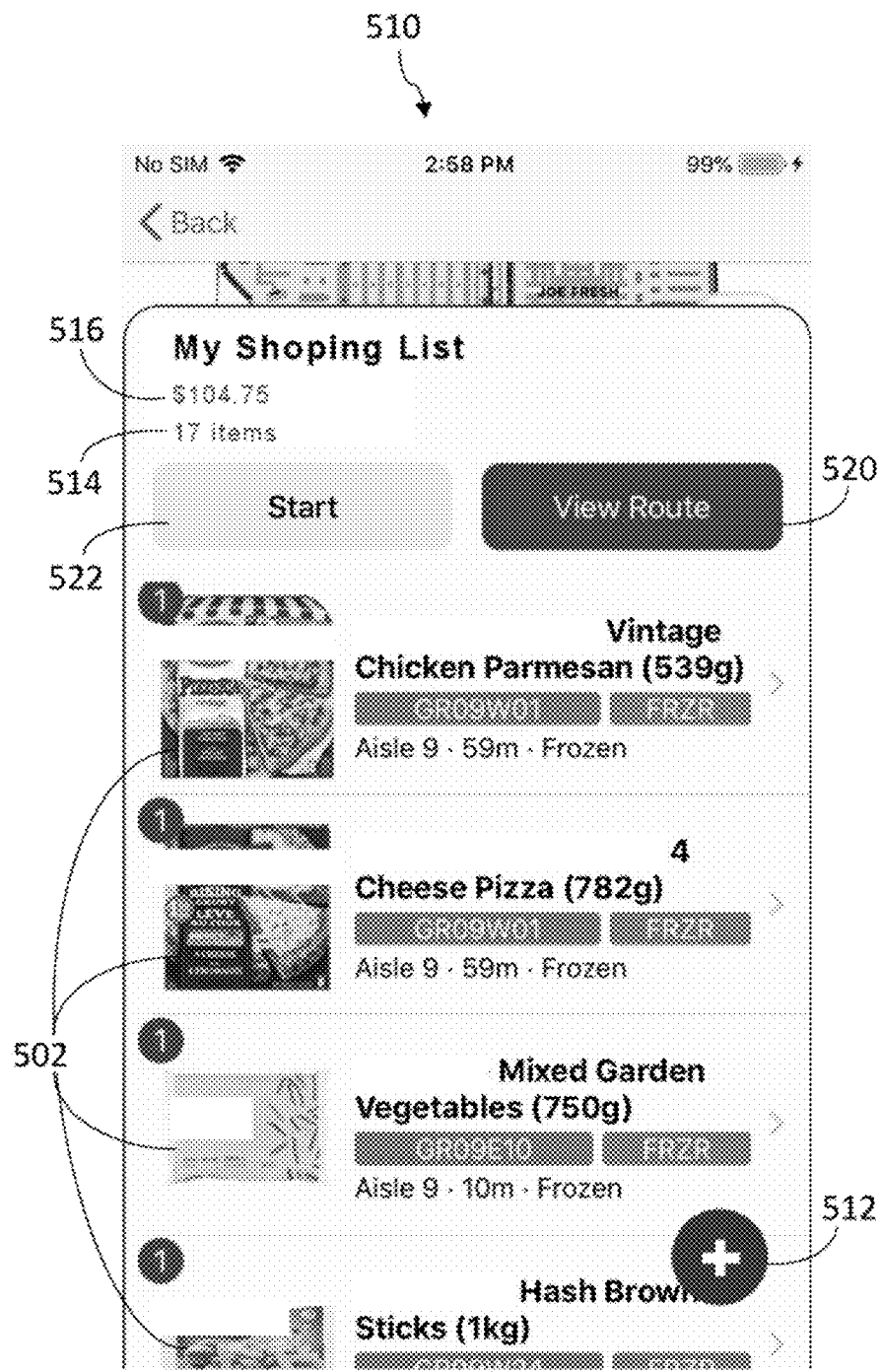
FIGS. 5B, 5C are exemplary screenshots of a shopping list displayed on a screen of a mobile device, in accordance with several embodiments.

Now referring to FIGS. 5B, illustrated therein is an exemplary screenshot of a shopping list 510 displayed on a touchscreen of a mobile device. The shopping list 510 is populated as a user selects items 502 to add from the facility directory (i.e. facility directory 500 in FIG. 5A). A user may add a new item 502 to the shopping list 510 by a touch command on the add button 512 to transition to the facility directory. The shopping list 510 may include a quantity 514 of items 502 in the shopping list 510. The shopping list 510 may include and the total price 516 of the items 502. According to an embodiment, multiple shopping lists 510 may be generated for the same facility by a single user, if for example, the user is shopping for multiple parties.

Figure 5C:
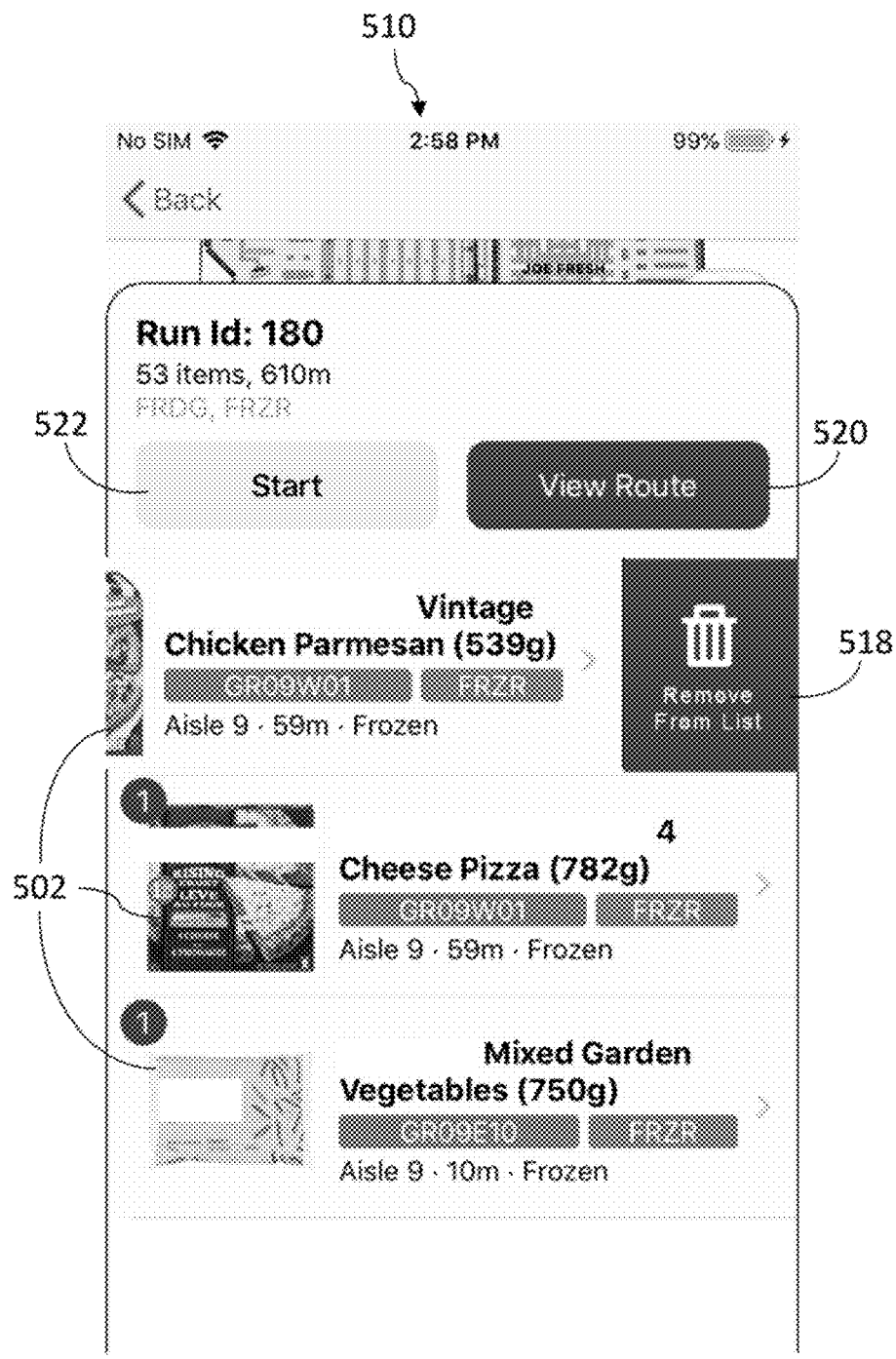

Referring to FIG. 5C, items 502 may also be removed from the shopping list 510 by, for example, a long press touch command on the item 502 to display a remove button 518. A touch command on the remove button 518 removes the item 502 from the shopping list 510. Once the shopping list 510 is populated with the desired items 502 as selected by the user, the user may view a route to pick up the items by a touch command on a route button 520. The route is determined according to the method described herein. The user may commence progress along the route by a touch command on a start button 522. Once progress is commenced the shopping list 510 reorders the items 502 according to the order in which those items will be reached along a route traversing the waypoints corresponding to those items 502 as described herein.

Figure 5D:
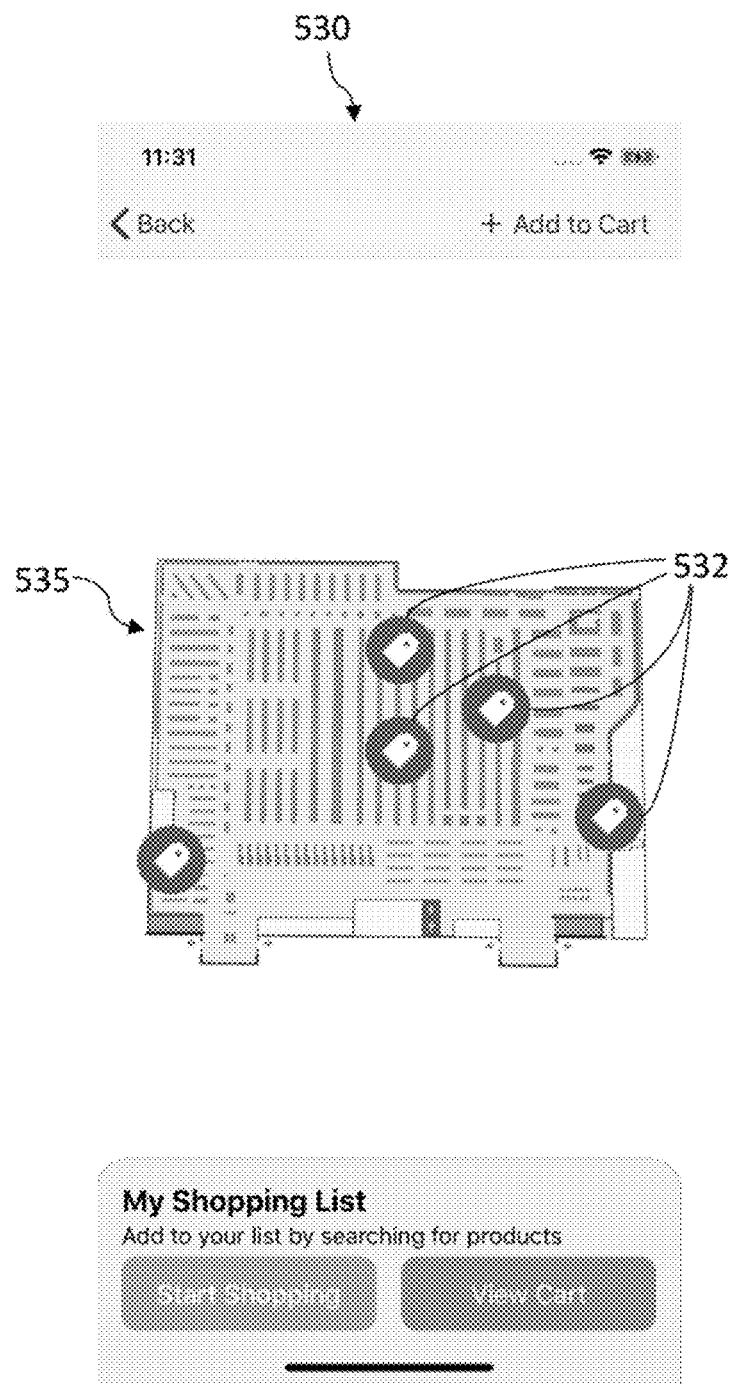
FIGS. 5D, 5E are exemplary screenshots of a promotion bubble displayed on a screen of a mobile device, in accordance with several embodiments.
Figure 5E:
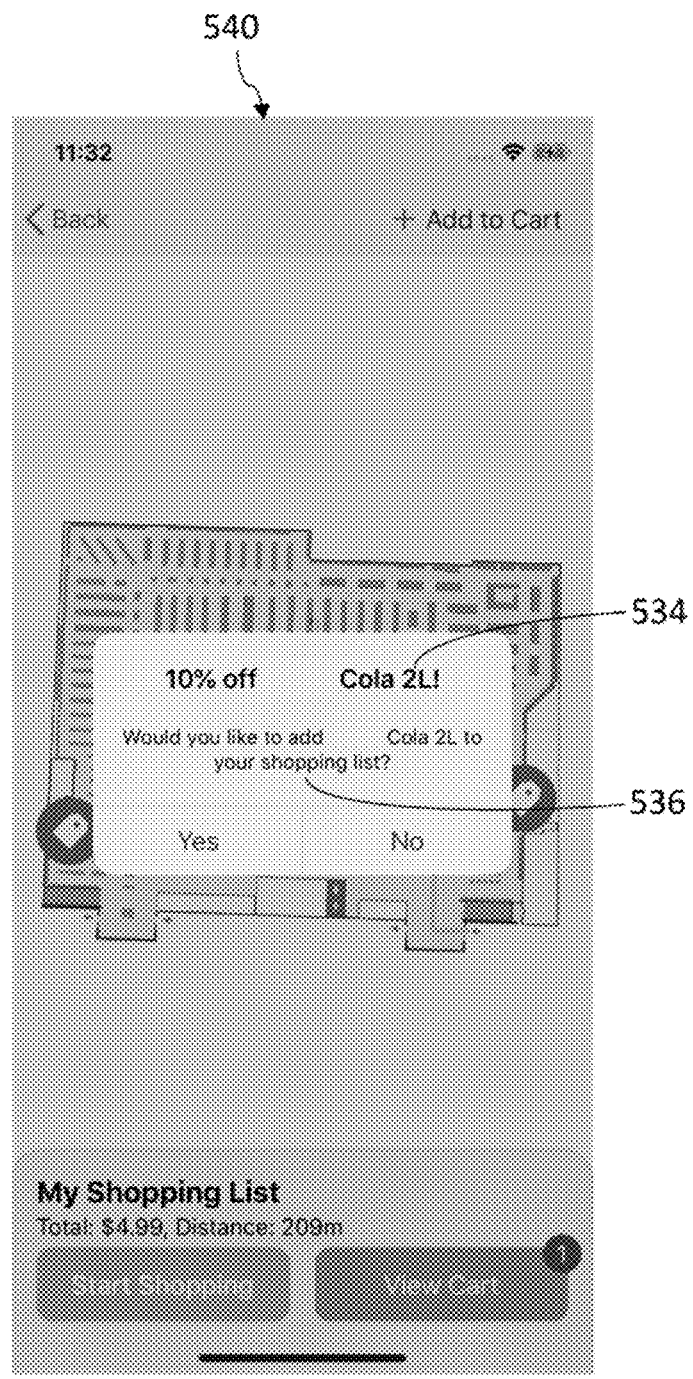

Now referring to FIG. 5D, illustrated therein is an exemplary screenshot 530 of promotion bubbles 532, according to an embodiment. Promotion bubbles 532 is another way to add items to the shopping list (i.e. items 502 to shopping list 500 in FIG. 5B) instead of using the search function (FIG. 5A). For example, a user may choose to view promotion bubbles instead of searching by name to select items at Act 402 of method 400. The promotion bubbles 532 are displayed on a facility map 535 at the locations of items 502 that are on sale/discounted. The facility map 535 be scrolled/navigated by, for example, a touch gesture via the touchscreen (i.e. pinch to zoom, touch and drag to move, etc.). A user may select a promotion bubble 532 by a touch command to display information 534 about the sale/discount and the option 536 to add the item 502 to the shipping list 500 (FIG. 5E).

Referring back to FIG. 4, at 404, a central processing unit (CPU) generates a navigation graph. According to an embodiment the CPU may be in a mobile device (i.e. CPU 208 in FIG. 3). The navigation graph represents the traversable area(s) (e.g. pathways, aisles, etc.) of the facility between the set of waypoints. The navigation graph includes all the possible paths, between two given waypoints, while accounting for obstructions between the two waypoints. In generating the navigation graph, the CPU may access the facility metadata stored in the device's memory to retrieve the nodes corresponding to the location of each waypoint, turn, intersection and obstruction within the facility.

Figure 6A:
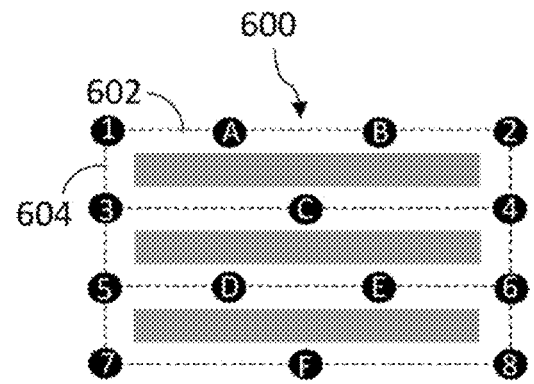
FIG. 6A is a diagram of an exemplary navigation graph for a set of waypoints, in accordance with an embodiment.

Now referring to FIG. 6A, illustrated therein is a diagram of an exemplary navigation graph 600. The navigation graph 600 may be generated at Act 404 of method 400. The navigation graph 600 includes obstructions (represented by grey bars). The obstructions may be shelves, racks, and the like within the facility that are generally untraversable. The navigation graph 600 includes turns (labelled 1, 2, 7, 8). The navigational graph 600 includes intersections (labelled 3, 4, 5, 6). The navigation graph 600 includes a set of waypoints (labelled A, B, C, D, E, F). Each waypoint A, B, C, D, E, F corresponds to an item (i.e. items 502 in FIGS. 5A, 5B, 5C) selected by the user and included in the shopping list (i.e. shopping list 510 in FIGS. 5B, 5C). The set of waypoints A, B, C, D, E, F may be received at Act 402 in method 400.

The navigation graph 600 includes traversable areas (represented by dotted lines). The traversable areas may be aisles, pathways and the like. The traversable areas are comprised of straight edges between waypoints/turns/intersections. For example, edge 602 represents the traversable area between waypoint A and turn 1; edge 604 represents the traversable area between turn 1 and intersection 3, and so on.

Referring back to FIG. 4, at 406 a graphics processing unit (GPU) determines the shortest traversable distance between each waypoint and every other waypoint based on the navigation graph. The GPU may be in a mobile device (i.e. GPU 214 in FIG. 3). The GPU may be within a geographical information system (GIS) (i.e. GIS 112 in FIG. 1B). The GPU determines the shortest traversable distance between two given waypoints by considering all possible traversable paths between those two waypoints and adding the length of the edges (e.g. edges 204 and 206 in FIG. 6A) connecting those waypoints. Once the shortest traversable distance is determined, the path corresponding to the shortest traversable distance between each pair of waypoints is stored in a memory (i.e. memory 206 in FIG. 3).

According to an embodiment Acts 404 and 406 may be performed concurrently by the CPU and GPU, respectively for increased time efficiency and to divide to the computational processing required. That is, as the navigation graph is generated by the CPU at 404, the GPU may determine the minimum traversable distance between each waypoint and every other waypoint.

Figure 6B:
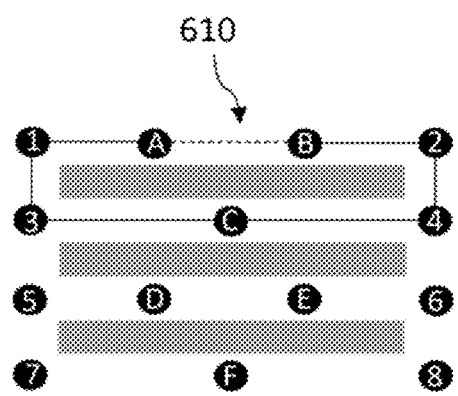
FIGS. 6B and 6C are diagrams of exemplary navigation graphs used to determine the shortest traversable distance between waypoints, in accordance with several embodiments.

Now referring to FIG. 6B, illustrated therein is an exemplary navigation graph 610 used, at Act 406, to determine the shortest traversable distance between waypoints A and B. The navigation graph 610 shows two possible traversable paths between waypoints A and B: a first path represented by the dotted line traversing points A-B; a second path represented by the solid line traversing A-1-3-C-4-2-B. Other possible traversable paths, for example, traversing A-1-3-5-D-E-6-4-2-B are not shown for brevity. At Act 406, the first path (dotted line) traversing point A-B, is determined to have the shortest traversable distance between waypoints A and B; thus the first path (dotted line) is stored in the memory. For reference, Table 700 in FIG. 7A lists the shortest traversable distance, and Table 710 in FIG. 7B lists the corresponding shortest traversable path, between each waypoint and every other waypoint shown in FIGS. 6A, 6B, 6C.

Figure 6C:
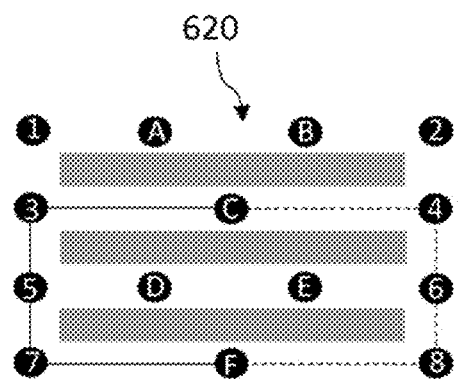

Referring to FIG. 6C, illustrated therein is an exemplary navigation graph 620 used, at Act 406, to determine the shortest traversable distance between waypoints C and F. The navigation graph 620 shows two possible traversable paths between waypoints C and F: a first path (dotted line) traversing points C-4-6-8-F; and a second path (solid line) traversing C-3-5-7-F. Other possible traversable paths, for example, traversing C-4-6-E-D-5-7-F are not shown for brevity. At Act 406, the first path (dotted line) traversing C-4-6-8-F, and the second path (solid line) traversing C-3-5-7-F are both determined to have the shortest traversable distance between waypoints C and F; thus, one of these paths is chosen and stored in the memory. For reference, Table 700 in FIG. 7A lists the shortest traversable distance, and Table 710 in FIG. 7B lists the corresponding shortest traversable path, between each waypoint and every other waypoint shown in FIGS. 6A, 6B, 6C.

At 408, default, user-based and item-based requirements for plotting a route are considered by the CPU. These requirements are rules for plotting a route traversing the set of waypoints. Default requirements are pre-programmed rules that are always applied when plotting the route. For example, a default requirement is each waypoint received at Act 402 is visited only once. Another default requirement is the total distance of the route is minimized as much as possible. Certain default requirements may be associated with a facility or facility type. For example, if the facility has a single entrance, the start point for the route may be the waypoint located closest to the entrance of the facility.

User-based requirements are optional rules set by the user. For example, if a facility has multiple entrances and exits, the user may select an entrance and an exit to be included in the route.

Item-based requirements are rules associated with the items that are selected by the user and included in the shopping list. For example, frozen items must be picked up within 20 minutes of the end of the route (i.e. frozen items are picked up closer to the end of the route). Another item-based requirement is that larger/heavier items are picked up prior to smaller/lighter items (i.e. larger items are picked up closer to the beginning of the route). The CPU may group certain items into categories, with an item-based requirement for that category. For example, frozen items may be grouped in a category where all frozen items must be picked up within 20 minutes of the end of the route. Large items may be grouped into a category with an item-based requirement that those waypoints are reached successively and prior to reaching smaller items. Conversely, small items may be grouped into a category such that those waypoints are reached successively and following larger items.

At 410, the GPU plots a route to traverse the set of waypoints according to the default, user-based and item-based requirements. The GPU applies ant colony simulation to attempt different routes traversing the set of waypoints in a manner similar to the Travelling Salesperson Problem. Ant colony optimization algorithms are known in the art as an efficient method to generate an approximate solution to the Travelling Salesperson Problem. Thus, the route is optimized in iterations by attempting different routes to traverse the set of waypoints in order to arrive at the route which best agrees with the default, user-based and item-based requirements.

The first attempt at plotting a route is done randomly with respect to the order in which waypoints are reached, (apart from the start and end points if these are set as default of user-based requirements). This initial route represents a baseline solution for assessing the optimization of routes plotted in subsequent iterations. In subsequent iterations, the order in which waypoints are reached is varied, while attempting to abide by the default, user-based and item-based requirements. If a subsequent iteration determines a route that better satisfies the default, user-based and item-based requirements, that route is stored as the best solution for comparison with subsequent iterations. When no further optimization of the route is possible, the best solution is returned as the route.

The best solution may not completely satisfy all default, user-based and item-based requirements since one requirement may conflict with another. For example, the largest item may be a freezer item, necessitating that item to be reached at a later point in the route, after reaching smaller items, to ensure the frozen item is reached within 20 minutes of reaching the end of the route. As such, the ant colony simulation may balance conflicting requirements to determine the best solution that satisfies the most requirements. In cases, where the GPU determines that there is more than one route that are equivalent in terms of satisfying the requirements, the user may have the option of selecting the route.

Once, the route is determined, the items displayed in the shopping list (i.e. shopping list 510 in FIGS. 5B, 5C) is reordered according to the order in which the waypoints corresponding to those items will be reached along the route.

Figure 8:
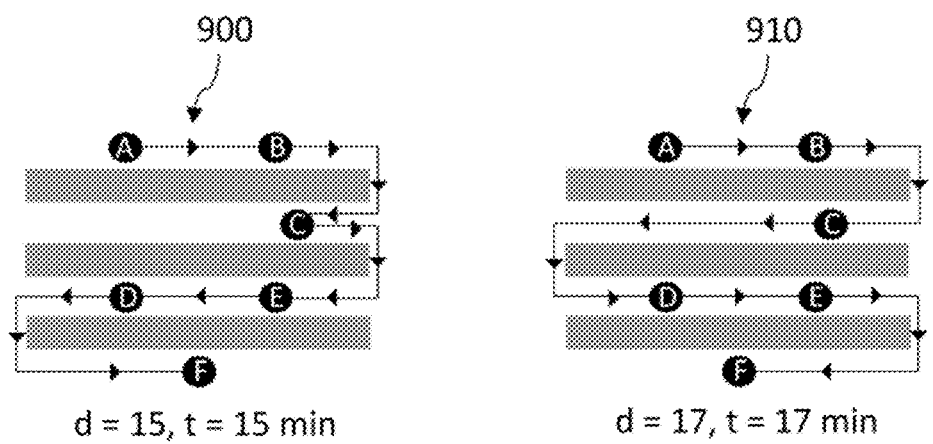
FIG. 8 shows diagrams of exemplary plotting iterations between a set of waypoints, in accordance with an embodiment.

Now referring to FIG. 8, illustrated therein is an exemplary plotting of two routes 900, 910 between waypoints A, B, C, D, E, F. The exemplary plotting may be done at Act 412 of method 400. The waypoints have the following characteristics based on the facility metadata: waypoint A is the closest waypoint to the only entrance; waypoint F is closest to the exit/cashier; the item at waypoint B is the largest; the item at waypoint C is the smallest; the item at waypoint E is frozen. The routes 900, 910 are plotted according to the following default requirements: 1. each waypoint A, B, C, D, E, F is visited once; 2. the total distance of the route is minimized as much as possible; and 3. the waypoint closest to the entrance is the first waypoint along the route. The routes 900, 910 are plotted according to the following item-based requirements: 1. larger items are reached before smaller items along the route; and 2. frozen items must be reached within 20 minutes of reaching the end of the route. The total distance (d) in arbitrary distance units, and time estimate (t) in minutes for traversing the waypoints is shown below each route 900, 910.

Both routes 900, 910 generally abide by the default and item-based requirements described above. Waypoint A, being closest to the entrance is the first waypoint reached in both routes 900, 910. Both routes 900, 910 may be traversed in less than 20 minutes, thus the freezer item-based requirement is satisfied. The size item-based requirement is generally satisfied given that waypoint B is the second of six waypoints reached.

The route is determined to be route 900 since the total distance (and time estimate) to traverse route 900 is less than route 910, with all other requirements being satisfied for both routes. Thus, shopping/pick up efficiency is increased by taking route 900 rather than route 910, since route 900 is 2 distance units shorter and 2 minutes less time. Experimentation suggests that the method 400 may increase shopping/pick up efficiency significantly, for example, a reduction of up to ~13% distance travelled and a reduction of up to 7 minutes less time taken, on average, when compared to picking up the items without route optimization (i.e. picking the items randomly without abiding the requirements at Act 410).

Referring back to FIG. 4A, at 412, the CPU determines a time estimate for traversing the set of waypoints. The time estimate is based on the time taken to travel the shortest traversable path between each pair of waypoints as determined at Act 406.

At 414 the route is displayed on a facility map by the CPU (i.e. CPU 208 in FIG. 3). To display the route on the facility map, the CPU may access the facility maps stored in the memory (i.e. memory 206 in FIG. 3).

Figure 9A:
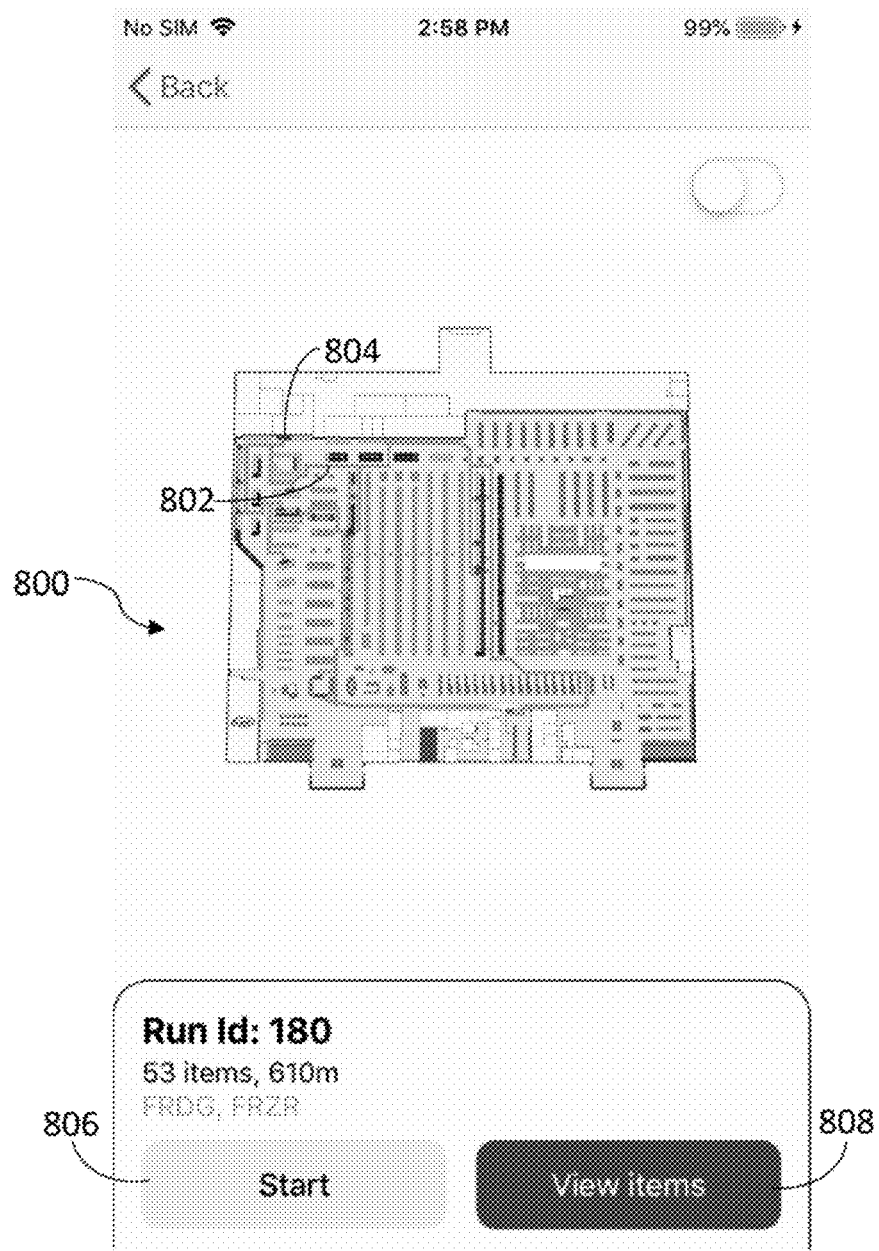
FIGS. 9A, 9B and 9C are exemplary screenshots of a shopping list and a route displayed on a facility map, in accordance with several embodiments.
Figure 9B:
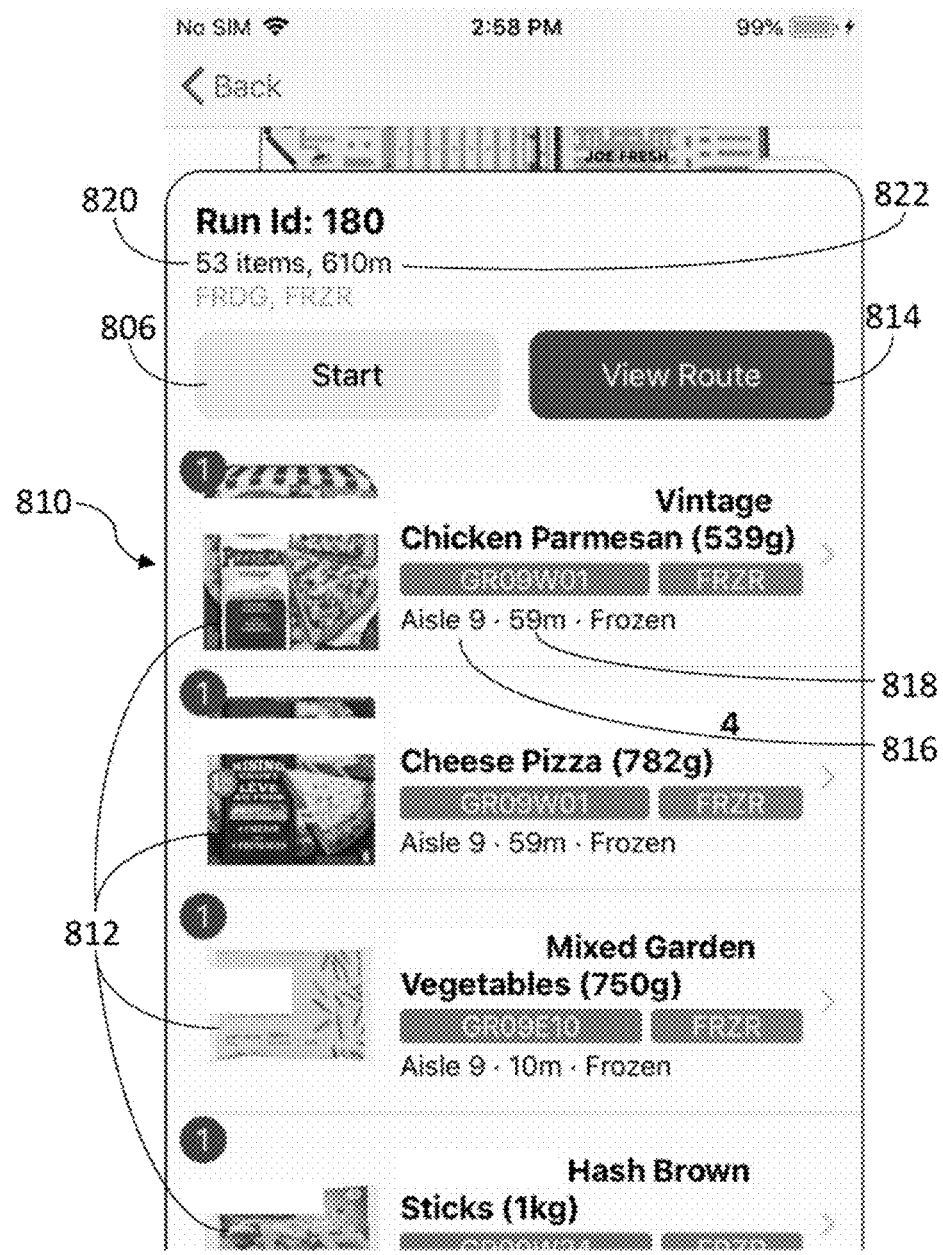
Figure 9C:
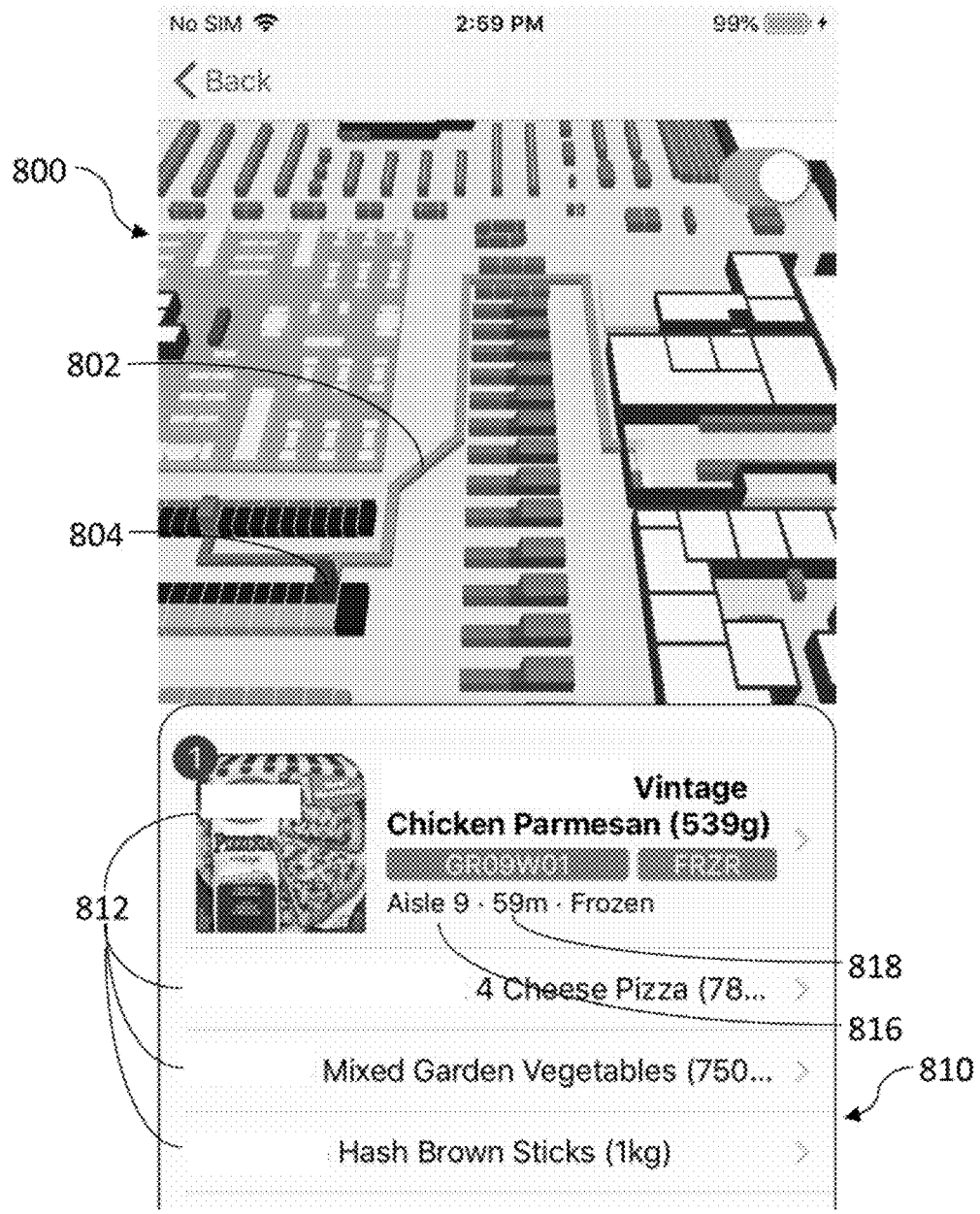

Referring to FIGS. 9A, 9B and 9C illustrated therein are exemplary screenshots of a facility map 800 and shopping list 810 displayed on a touchscreen of a mobile device. The user has the option to switch between viewing the facility map 800 and the shopping list 810. The user may view the shopping list 810 by a touch command on the view items button 808 (FIG. 9A). The user may view the facility map 800 by a touch command on the view route button 814 (FIG. 9B).

The facility map 800 includes a route 802 traversing a set of waypoints (one waypoint 804 is shown). Each waypoint 804 corresponds to one item in the shopping list 810. The shopping list 810 includes the same items 812 as shopping list 510 in FIGS. 5B and 5C. However, the shopping list 810, lists items 812 in the order that the waypoints corresponding to those items 812 are reached along the route 802. The shopping list 810 may include a total number 820 of items 812. The shopping list 810 may include a total distance 822 of the route 802. The shopping list 810 may include a location 816 for each item 812 within the facility (FIG. 9C). The shopping list 810 may include an approximate distance 818 along the route to reach each item 812 (FIG. 9C).

The facility map 800 and route 802 may be shown in entirety (FIG. 9A) or a portion thereof (FIG. 9C). For example, if the route 802 traverses multiple floors of a facility, only the floor with the starting location may be initially displayed. The facility map 800 may be manipulated through finger gestures. For example, the portion of the facility map 800 shown on the screen may be moved by a single-finger gesture, or magnified or reduced by a two-finger gesture (e.g. a pinch) on the touchscreen. When the user wishes to commence progress along the route 802, a touch command on the start button 806 causes the facility map 800 and route 802 to be displayed.

According to other embodiments, the facility map 800 may include one or more of the following: a countdown timer indicating the elapsed time since the route 802 was commenced; arrows/icons directing the user to turn or to change floors; a compass pointing north; and colored portions of the route 802 corresponding to waypoints further along the route 802 beyond the next waypoint.

According to an embodiment, the mobile device displaying the map 800 may provide audible, visual or tactile alerts at intervals approaching the time estimate (i.e. the time estimate determined at Act 408 in FIG. 4).

Referring back to FIG. 4, at 416, one or more updates related to progress along the route are received. As a user traverses the waypoints in the facility and picks up the items, the user may provide updates by a single tap gesture via the user interface to indicate progress along the route and the user's current location. This may be done, for example, by the user checking off items on the shopping list that they have acquired. A user may choose to skip an item/waypoint and proceed to the next waypoint on the route if desired.

The one or more updates received at 416 may also be provided by a facility owner/administrator via a backend system (i.e. backend system 102 in FIGS. 1 and 2) configured to communicate with the mobile device over a communications network. The facility owner/administrator may include updates to the traversable areas of the facility, for example, temporary obstructions where aisles, pathways are closed for maintenance and/or sanitation.

Figure 9D:
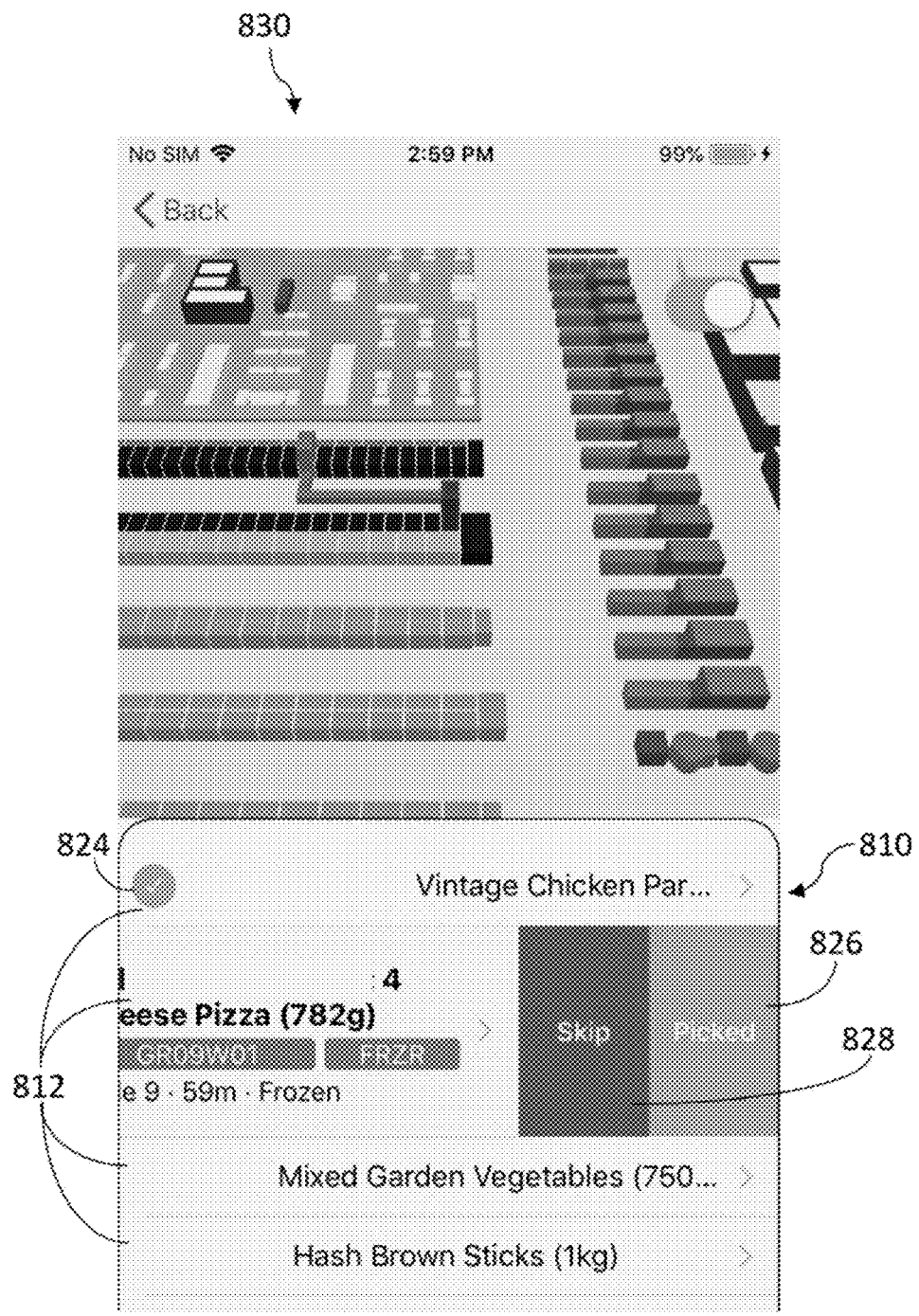
FIG. 9D is an exemplary screenshot of an update provided by a user, in accordance with an embodiment.

Now referring to FIG. 9D, illustrated therein is an exemplary screenshot of an update 830 provided by a user on a touchscreen of a mobile device. A user may indicate that an item 812 has been picked by a touch command on the picked button 826. A user may also skip an item 812 by a touch command on the skip button 828. The shopping list 810 is updated to indicate that the item has been acquired, by for example a check mark 824 next to the acquired item 812.

Figure 9E:
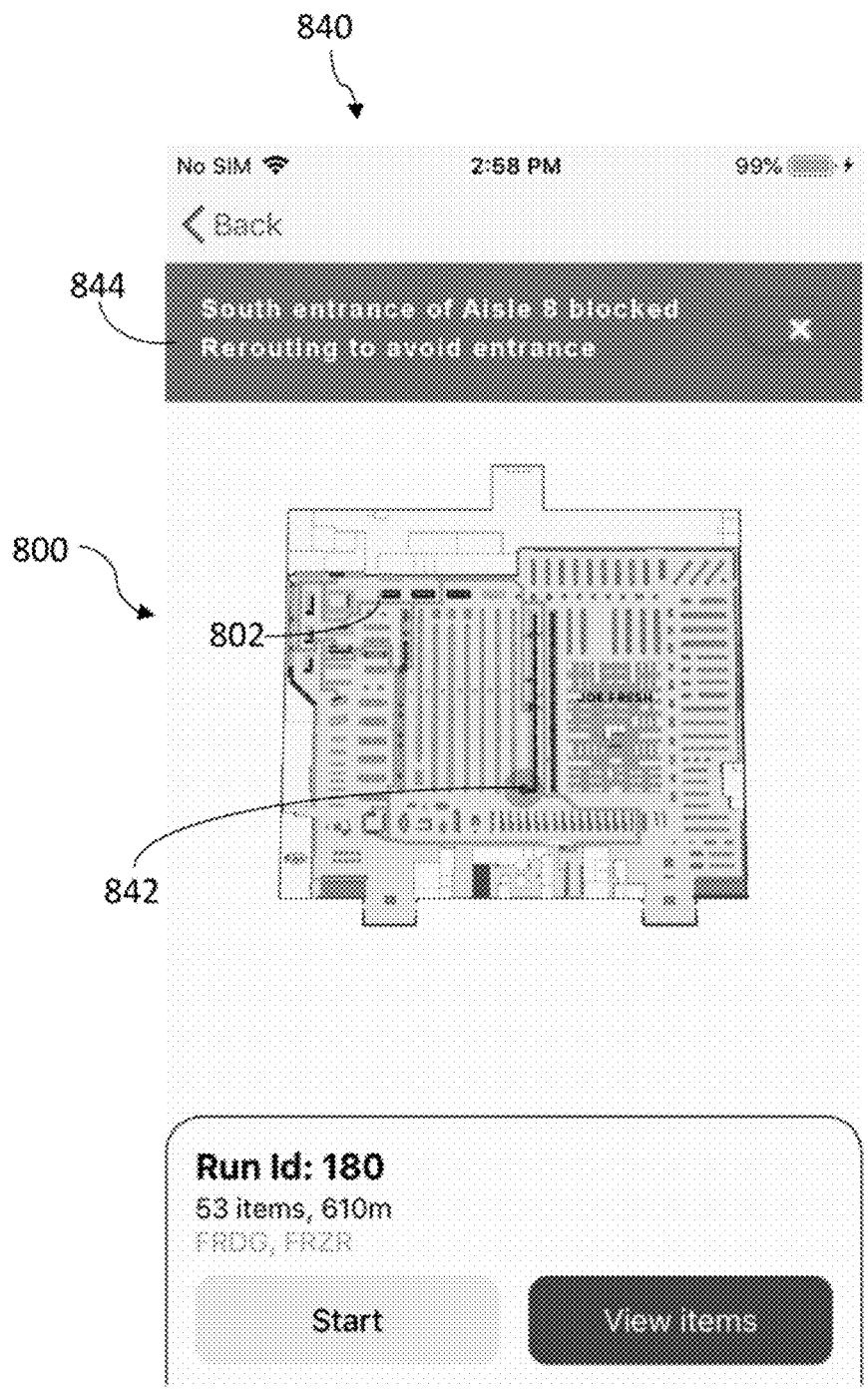
FIG. 9E is an exemplary screenshot of an update provided by a facility owner/administrator via a backend system, in accordance with an embodiment.

Now referring to FIG. 9E, illustrated therein is an exemplary screenshot of an update 840. The update 840 is for an obstruction 842. The obstruction 842 is shown on the facility map 800. An alert 844 is provided, signaling that the route 802 is being adjusted to bypass for the obstruction 842.

Referring back to FIG. 4, at 418, the route is adjusted based on the one or more updates. Where an update is provided by the user by checking an item off the shopping list, the waypoint corresponding to that item is considered to be the user's current location and progression along the route up to that waypoint is assumed. Where the update provided by the user at Act 416 is to skip an item, the skipped item/waypoint may be appended to the end of the route.

At 420, the adjusted route is displayed on the facility map. Where the user provides an update by checking an item off the shopping list at Act 416, the adjusted route shows progress along to route up to that item/waypoint. Where the user provides an update by skipping an item at Act 416, the adjusted route may be redrawn to append that item to the end of the route. Where an update is received indicating an obstruction along the route, the route may be redrawn to bypass the obstruction.

While the above description provides examples of one or more apparatus, methods, or systems, it will be appreciated that other apparatus, methods, or systems may be within the scope of the claims as interpreted by one of skill in the art.

The invention claimed is:

1. A wayfinding system for providing, on an electronic facility map, a route between waypoints within a facility, the wayfinding system comprising:
a mobile device which stores the electronic facility map, a facility directory, facility metadata, and item information, the mobile device configured to:
present a user interface on a display of the mobile device;
display the facility directory via the user interface, wherein the facility directory lists a plurality of items, and wherein each of the plurality of items is associated with at least one location within the facility;
receive a user selection of the plurality of items as a set of waypoints via the user interface, wherein each waypoint represents a location within the facility;
generate, by a central processing unit of the mobile device, a navigation graph of the traversable areas connecting the set of waypoints based on the facility metadata, wherein the navigation graph includes nodes representing the set of waypoints and at least one of turns, intersections, and obstructions;
determine, by a graphics processing unit of the mobile device, a shortest traversable path between each waypoint and every other waypoint based on the navigation graph, wherein generating the navigation graph by the central processing unit and determining the shortest traversable path between each waypoint and every other waypoint is performed concurrently;
set, by a central processing unit of the mobile device, one or more requirements for plotting a route traversing the set of waypoints; and
plot, by the graphics processing unit, the route traversing the set of waypoints, wherein the route is plotted according to the one or more requirements, and wherein the route is optimized in real-time and by varying an order of the set of waypoints iteratively.

2. The wayfinding system of claim 1, wherein the mobile device is further configured to display the route traversing the set of waypoints within the facility.

3. The wayfinding system of claim 1, wherein the mobile device is further configured to receive one or more updates and adjust the route based on the one or more updates.

4. The wayfinding system of claim 1, wherein the display of the mobile device is a touch screen display, and wherein the mobile device is configured to receive the user selection by detecting a touch on items listed in the facility directory.

5. The wayfinding system of claim 1, wherein the mobile device is further configured to display item information for each item listed in the facility directory.

6. The wayfinding system of claim 1, wherein the mobile device is further configured to determine, by the central processing unit, a time estimate for traversing the route.

7. The wayfinding system of claim 6, wherein the mobile device is further configured to provide an alert at increments approaching the time estimate.

8. The wayfinding system of claim 6, further comprising:
a backend system, wirelessly connected to the mobile device, and configured to:
store the electronic facility map, the facility directory and the facility metadata in a database;
provide the electronic facility map, the facility directory and facility metadata to the mobile device;
receive the user selection as the set of waypoints from the mobile device;
generate the navigation graph based on the facility metadata;
determine, a shortest traversable path between each waypoint and every other waypoint based on the navigation graph;
set one or more requirements for plotting the route traversing the set of waypoints;
plot the route traversing the set of waypoints according to the one or more requirements;
determine the time estimate for traversing the route; and
provide the route and the time estimate to the mobile device in near real-time.

9. The wayfinding system of claim 8 further comprising a facility device, connected to the backend system, and configured to edit and provide the facility directory and item information to the backend system in real-time.

10. The wayfinding system of claim 8, further comprising an administrator device, connected to the backend system, and configured to edit and provide the facility map, the facility directory, the facility metadata and item information to the backend system in real-time.

11. The wayfinding system of claim 8, further comprising:
a geographical information system (GIS), hosted internally by the backend system or supplied externally to the backend system, configured to store the electronic facility map, the facility directory and facility metadata.

12. The wayfinding system of claim 11, wherein the GIS is further configured to plot the route.

13. The wayfinding system of claim 12, wherein the GIS is further configured to determine a time estimate.

14. The system of claim 1, wherein the set of waypoints includes at least three waypoints.

15. A non-transitory computer-readable storage medium having stored thereon an electronic facility map, a facility directory, facility metadata, item information and computer-executable instructions that, when executed by a processor of a mobile device, cause the processor of the mobile device to execute a mobile wayfinding application for integration into a wayfinding system for providing a route between waypoints within a facility, wherein the mobile wayfinding application causes the mobile device to:
- store a facility map, a facility directory, facility metadata and item information in a memory of the mobile device;
- present a user interface on a display of the mobile device;
- display the facility directory via the user interface, wherein the facility directory lists a plurality of items, and wherein each of the plurality of items is associated with at least one location within the facility;
- receive a user selection of the plurality of items as a set of waypoints via the user interface, wherein each waypoint represents a location within the facility;
- generate, by a central processing unit of the mobile device, a navigation graph of the traversable areas connecting the set of waypoints based on the facility metadata wherein the navigation graph includes nodes representing the set of waypoints and at least one of turns, intersections, and obstructions;
- determine, by a graphics processing unit of the mobile device, a shortest traversable path between each waypoint and every other waypoint based on the navigation graph, wherein generating the navigation graph by the central processing unit and determining the shortest traversable path between each waypoint and every other waypoint is performed concurrently;
- set, by a central processing unit of the mobile device, one or more requirements for plotting a route traversing the set of waypoints; and
- plot, by the graphics processing unit, the route traversing the set of waypoints, wherein the route is plotted according to the one or more requirements.

16. A method for plotting a route, on an electronic facility map, between waypoints within a facility, the method comprising:
- generating, by a central processing unit of a mobile device which stores the electronic facility map, a facility directory, facility metadata, and item information, a navigation graph of traversable areas connecting a set of waypoints, wherein each waypoint represents a location within the facility, and wherein at least one waypoint represents an item, and wherein the navigation graph includes nodes representing the set of waypoints and at least one of turns, intersections, and obstructions;
- determining, by a graphics processing unit of the mobile device, a shortest traversable path between each waypoint and every other waypoint based on the navigation graph;
- setting one or more requirements for plotting a route traversing the set of waypoints; and
- plotting the route traversing the set of waypoints, wherein the route is plotted according to the one or more requirements.

17. The method of claim 16, further comprising:
displaying the route on the electronic facility map.

18. The method of claim 16, further comprising:
receiving a user selection of items as the set of waypoints.

19. The method of claim 16, further comprising:
receiving one or more updates;
adjusting the route based on the one or more updates; and
displaying the adjusted route within the facility.

20. The method of claim 16, further comprising:
determining a time estimate to traverse the plurality of waypoints; and
adjusting the route to traverse the waypoints within the time estimate.

21. The method of claim 16, wherein the navigation graph is generated concurrent to the determination of the shortest traversable path between each waypoint and every other waypoint.

22. The method of claim 16, wherein the set of waypoints includes at least three waypoints.

* * * * *